US010846482B2

(12) United States Patent
Walsh

(10) Patent No.: US 10,846,482 B2
(45) Date of Patent: Nov. 24, 2020

(54) MULTI-WORD PHRASE BASED ANALYSIS OF ELECTRONIC DOCUMENTS

(71) Applicant: CLOUDDOCS.COM, LLC, Victor, NY (US)

(72) Inventor: John Frank Walsh, Rochester, NY (US)

(73) Assignee: CLOUDDOCS.COM, LLC, Victor, NY (US)

( * ) Notice: Subject to any disclaimer, the term of this patent is extended or adjusted under 35 U.S.C. 154(b) by 0 days.

(21) Appl. No.: 16/575,948

(22) Filed: Sep. 19, 2019

(65) Prior Publication Data

US 2020/0012723 A1 Jan. 9, 2020

Related U.S. Application Data

(63) Continuation of application No. 16/045,263, filed on Jul. 25, 2018, now Pat. No. 10,445,430.

(Continued)

(51) Int. Cl.
| | | |
|---|---|---|
| *G06F 17/27* | (2006.01) | |
| *G06F 40/30* | (2020.01) | |
| *G06K 9/00* | (2006.01) | |
| *G06F 16/93* | (2019.01) | |
| *G06F 16/33* | (2019.01) | |
| *G06F 16/31* | (2019.01) | |
| *G06K 9/68* | (2006.01) | |

(Continued)

(52) U.S. Cl.
CPC ............ *G06F 40/30* (2020.01); *G06F 16/313* (2019.01); *G06F 16/3344* (2019.01); *G06F 16/93* (2019.01); *G06F 40/194* (2020.01); *G06F 40/226* (2020.01); *G06F 40/284* (2020.01); *G06K 9/00442* (2013.01); *G06K 9/00456* (2013.01); *G06K 9/6878* (2013.01)

(58) Field of Classification Search
CPC .. G06F 17/2785; G06F 16/93; G06F 17/2211; G06F 17/2725; G06F 17/277; G06F 16/313; G06F 16/3344; G06K 9/00456; G06K 9/00442; G06K 9/6878
USPC .......................................................... 704/9
See application file for complete search history.

(56) References Cited

U.S. PATENT DOCUMENTS

2014/0099038 A1* 4/2014 Okada ................ G06K 9/00469
382/229

OTHER PUBLICATIONS

Notice of Allowance issued in U.S. Appl. No. 16/045,263 dated Jun. 4, 2019.

* cited by examiner

*Primary Examiner* — Thierry L Pham
(74) *Attorney, Agent, or Firm* — Rossi, Kimms & McDowell LLP

(57) ABSTRACT

A document processing system is configured to identify, for each accessed electronic document in a first set of multiple electronic documents, a set of identified multi-word phrases determined to be in ordered text information in the accessed electronic document, each multi-word phrase of the set of identified multi-word phrases including adjacent words in the ordered text information; and determine, for each accessed electronic document in the first set of multiple electronic documents, a selected document type from the first set of document types based at least on an analysis of the set of identified multi-word phrases with respect to multi-word-phrase characteristics identified by a first definition and associated with each document type in a first set of document types associated with a first document-set type.

18 Claims, 11 Drawing Sheets

Related U.S. Application Data

(60) Provisional application No. 62/537,197, filed on Jul. 26, 2017.

(51) Int. Cl.
*G06F 40/194* (2020.01)
*G06F 40/226* (2020.01)
*G06F 40/284* (2020.01)
*G06F 17/21* (2006.01)

MULTI-WORD PHRASE BASED ANALYSIS OF ELECTRONIC DOCUMENTS

CROSS-REFERENCE TO RELATED APPLICATION

This application is a continuation of U.S. patent application Ser. No. 16/045,263, filed on Jul. 25, 2018, which claims the benefit of U.S. Provisional Application No. 62/537,197, filed Jul. 26, 2017, the entire disclosure of both of these applications is hereby incorporated herein by reference.

TECHNICAL FIELD

Aspects of this disclosure generally are related to document processing system architectures, including data structures, that implement methods to execute multi-word phrase based analyses of electronic or other computer-readable documents.

BACKGROUND

A conventional document processing system in the automobile industry receives paper copies of a set of all documents that were involved in an automobile transaction, such as a transaction for the purchase of an automobile. Such a set of documents is referred to in the automobile industry as a "deal jacket". Upon receipt of the paper deal jacket, the paper documents in such deal jacket are electronically scanned to generate corresponding electronic documents, such as Portable Document Format ("PDF") files, known in the art. The electronic document version of the deal jacket is then manually reviewed by one or more persons for completeness as part of a quality-review process.

However, such conventional document analysis is relatively time consuming and error-prone, since it involves a significant amount of manual review. Accordingly, a need in the art exists for improved document processing systems at least in the automobile industry that can facilitate more time efficient processing of document sets, such as deal jackets, with greater accuracy.

SUMMARY

At least the above-discussed need is addressed and technical solutions are achieved in the art by various embodiments of the present invention. In some embodiments, a system may include an input-output device system and a data processing device system. The input-output device system may include a processor-accessible memory device system. The data processing device system may be communicatively connected to the input-output device system and the processor-accessible memory device system. The data processing device system may be configured by a program stored by the processor-accessible memory device system at least to access a first definition of a first set of document types. The first definition may be stored by the processor-accessible memory device system, and the first definition may identify at least multi-word-phrase characteristics associated with each document type in the first set of document types. The data processing device system may be configured by the program at least to access each of at least two electronic documents in a first set of multiple electronic documents stored by the processor-accessible memory device system. The data processing device system may be configured by the program at least to identify, for each accessed electronic document in the first set of multiple electronic documents, a set of identified multi-word phrases determined to be in ordered text information in the accessed electronic document. Each multi-word phrase of the set of identified multi-word phrase may include adjacent words in the ordered text information. The data processing device system may be configured by the program at least to determine, for each accessed electronic document in the first set of multiple electronic documents, a selected document type from the first set of document types based at least on an analysis of the set of identified multi-word phrases with respect to the multi-word-phrase characteristics identified by the first definition and associated with each document type in the first set of document types. The data processing device system may be configured by the program at least to cause, for each accessed electronic document in the first set of multiple electronic documents, the processor-accessible memory device system to store an indication of the selected document type in association with the accessed electronic document.

In some embodiments, a system may include an input-output device system and a data processing device system. The input-output device system may include a processor-accessible memory device system. The data processing device system may be communicatively connected to the input-output device system and the processor-accessible memory device system. The data processing device system may be configured by a program stored by the processor-accessible memory device system at least to access a first definition of a first set of document types associated with a first document-set type. The first definition may be stored by the processor-accessible memory device system. The first definition may identify at least multi-word-phrase characteristics associated with each document type in the first set of document types associated with the first document-set type. The data processing device system may be configured by the program at least to access each of at least two electronic documents in a first set of multiple electronic documents stored by the processor-accessible memory device system. The first set of multiple electronic documents may be associated with the first document-set type. The data processing device system may be configured by the program at least to identify, for each accessed electronic document in the first set of multiple electronic documents, a set of identified multi-word phrases determined to be in ordered text information in the accessed electronic document. Each multi-word phrase of the set of identified multi-word phrases may include adjacent words in the ordered text information. The data processing device system may be configured by the program at least to determine, for each accessed electronic document in the first set of multiple electronic documents, a selected document type from the first set of document types based at least on an analysis of the set of identified multi-word phrases with respect to the multi-word-phrase characteristics identified by the first definition and associated with each document type in the first set of document types associated with the first document-set type. The data processing device system may be configured by the program at least to cause, for each accessed electronic document in the first set of multiple electronic documents, the processor-accessible memory device system to store an indication of the selected document type in association with the accessed electronic document.

In some embodiments, the data processing device system is configured by the program at least to access a particular electronic document in a second set of multiple electronic documents stored by the processor-accessible memory device system. The second set of multiple electronic documents may be non-identical documents associated with the first document-set type. The data processing device system may be configured by the program at least to identify, for the accessed particular electronic document in the second set of multiple electronic documents, a set of identified multi-word phrases determined to be in ordered text information in the accessed particular electronic document. Each multi-word phrase of the set of identified multi-word phrases identified for the accessed particular electronic document may include adjacent words in the ordered text information in the accessed particular electronic document. The data processing device system may be configured by the program at least to receive a user-indication via the input-output device system indicating a user-identified document type associated with the particular electronic document. The data processing device system may be configured by the program at least to cause the processor-accessible memory device system to store in association with each other, and as part of the first definition, (a) the user-identified document type, and (b) at least some multi-word phrases of the set of identified multi-word phrases determined to be in the ordered text information in the accessed particular electronic document. (a) may be included in the first set of document types in the first definition, and (b) may be included in the multi-word-phrase characteristics associated with the user-identified document type included in the first set of document types associated with the first document-set type in the first definition. The first set of multiple electronic documents may be mutually exclusive with the second set of multiple electronic documents. The data processing device system may be configured by the program at least to generate, for the accessed particular electronic document, a reduced set of multi-word phrases at least by removing, from the set of identified multi-word phrases determined to be in the ordered text information in the accessed particular electronic document, multi-word phrases that occur in any other electronic document within at least a subset of the second set of multiple electronic documents, where (b) may be such reduced set of multi-word phrases, which is included in the multi-word-phrase characteristics associated with the user-identified document type included in the first set of document types associated with the first document-set type in the first definition. The data processing device system may be configured by the program at least to generate, for the accessed particular electronic document, a reduced set of multi-word phrases at least by removing, from the set of identified multi-word phrases determined to be in the ordered text information in the accessed particular electronic document, phrases including a word not present in a predetermined dictionary, where (b) may be such reduced set of multi-word phrases, which is included in the multi-word-phrase characteristics associated with the user-identified document type included in the first set of document types associated with the first document-set type in the first definition.

In some embodiments, the multi-word-phrase characteristics associated with a particular document type in the first set of document types include distinct multi-word phrases for ordered text among multiple electronic documents associated with the first document-set type. The distinct multi-word phrases may exclude non-distinct multi-word phrases for ordered text among multiple electronic documents of the first document-set type. For each of at least one accessed electronic document in the first set of multiple electronic documents, the analysis of the set of identified multi-word phrases, with respect to the multi-word-phrase characteristics identified by the first definition and associated with each of at least the particular document type in the first set of document types associated with the first document-set type, may include a comparison of the set of identified multi-word phrases determined to be in ordered text information in the accessed electronic document with the distinct multi-word phrases identified by the first definition and associated with the particular document type in the first set of document types associated with the first document-set type.

In some embodiments, the processor-accessible memory device system has stored a second definition of a second set of document types associated with a second document-set type. The second definition may identify at least multi-word-phrase characteristics associated with each document type in the second set of document types associated with the second document-set type. The data processing device system may be configured by the program at least to determine a particular document-set type associated with a new set of multiple electronic documents. The data processing device system may be configured by the program at least to select the first document-set type for at least the analysis based at least on a determination that the particular document-set type corresponds to the first document-set type. The determination of the particular document-set type associated with the new set of multiple electronic documents may be based at least on a user indication received via the input-output device system. At least one document type may be the same between the first set of document types and the second set of document types, but the multi-word-phrase characteristics associated with the one document type may be different between the first definition and the second definition.

In some embodiments, for each accessed electronic document in the first set of multiple electronic documents, each multi-word phrase in the set of identified multi-word phrases may be two words.

In some embodiments, the multi-word-phrase characteristics associated with a particular document type in the first set of document types include a set of defined multi-word phrases for ordered text within an electronic document of the particular document type. For each of at least one accessed electronic document in the first set of multiple electronic documents, the analysis of the set of identified multi-word phrases, with respect to the multi-word-phrase characteristics identified by the first definition and associated with each of at least the particular document type in the first set of document types associated with the first document-set type, may include determining whether the set of identified multi-word phrases have a similarity with the set of defined multi-word phrases meeting a threshold. In some embodiments, the data processing device system is configured by the program at least to, for each of the at least one accessed electronic document in the first set of multiple electronic documents, and in a state in which it is determined that the threshold is not met for the accessed electronic document: determine, for the accessed electronic document, the selected document type from the first set of document types based at least on an image-comparison-analysis between a first image of the accessed electronic document and images of electronic documents from which the first definition is generated. In some embodiments, the data processing device system is configured by the program at least to: generate a first mega-pixel image from the first image of the accessed electronic document, the first mega-pixel image representing a first reduction in pixel resolution from the first image of the accessed electronic document; and generate a second mega-pixel image from a second image of a second electronic document from which the first definition is generated, the second mega-pixel image representing a second reduction in pixel resolution from the second image of the second electronic document from which the first definition is generated, a first resolution of the first mega-pixel image equal to a second resolution of the second mega-pixel image. In some embodiments, the image-comparison-analysis between the first image of the accessed electronic document and images of electronic documents from which the first definition is generated includes comparing pixel values of the first mega-pixel image and the second mega-pixel image. The data processing device system may be configured by the program at least to select the threshold based at least on a number of multi-word phrases in the set of defined multi-word phrases for ordered text within an electronic document of the particular document type. The data processing device system may be configured by the program at least to cause display, via the input-output device system and for each accessed electronic document in the first set of multiple electronic documents, of at least an image of the accessed electronic document along with a respective indication of the selected document type for the accessed electronic document. The data processing device system may be configured by the program at least to receive user-input via the input-output device system indicating that the selected document type for each of at least one accessed electronic document is incorrect. The data processing device system may be configured by the program at least to (i) change the threshold based at least on the user-input; or (ii) update the first definition based at least on the user-input; or both (i) and (ii).

In some embodiments, the multi-word-phrase characteristics associated with a particular document type in the first set of document types include page-based multi-word-phrase characteristics associated with a single document page. For each of at least one accessed electronic document in the first set of multiple electronic documents, the set of identified multi-word phrases may include identified-multi-word phrases associated with a single document page.

In some embodiments, the determination, for each accessed electronic document in the first set of multiple electronic documents, of the selected document type from the first set of document types results in a determination of a plurality of selected document types. The data processing device system may be configured by the program at least to confirm that each necessary document type in the first set of document types has a match in the plurality of selected document types. The data processing device system may be configured by the program at least to cause the processor-accessible memory device system to store a failure indication in a state where it is not confirmed that each necessary document type in the first set of document types has a match in the plurality of selected document types.

In some embodiments, the data processing device system is configured by the program at least to: utilize (a) the first document-set type and (b) the selected document type, for at least one accessed electronic document of the accessed at least two electronic documents in the first set of multiple electronic documents, to identify and access a corresponding verification rule set stored in the processor-accessible memory device system, the corresponding verification rule set corresponding to the one accessed electronic document; and verify a validity of the one accessed electronic document based at least on the identified and accessed corresponding verification rule set corresponding to the one accessed electronic document. In some embodiments, the accessed corresponding verification rule set includes an instruction to cause the data processing device system to present the one accessed electronic document via a user interface of the input-output device system for manual validation, and the verifying of the validity of the one accessed electronic document includes receiving an indication via the input-output device system that the manual validation has completed successfully.

In some embodiments, for each accessed electronic document in the first set of multiple electronic documents, each of at least most valid word instances determined to be in the ordered text information in the accessed electronic document is present in at least two multi-word phrases in the set of identified multi-word phrases determined to be in the ordered text information in the accessed electronic document.

In some embodiments, the data processing device system may be configured by the program at least to identify a subset of the first set of document types as necessary for the first set of multiple electronic documents based at least on the determination of the selected document type of at least one accessed electronic document in the first set of multiple electronic documents. The data processing device system may be configured by the program at least to cause the processor-accessible memory device system to store one or more indications that the subset of the first set of document types are necessary for the first set of multiple electronic documents.

In some embodiments, the data processing device system may be configured by the program at least to determine a storage location for one or more electronic documents in the first set of multiple electronic documents based at least on the determination of the selected document type for at least one accessed electronic document in the first set of multiple electronic documents. The data processing device system may be configured by the program at least to cause the processor-accessible memory device system to store at least one electronic document in the first set of multiple electronic documents at the determined storage location.

In some embodiments, the data processing device system is configured by the program at least to, in a state in which the first set of multiple electronic documents is stored as a single electronic document file, insert an electronic bookmark into the single electronic document file for each respective accessed electronic document of the accessed at least two electronic documents in the first set of multiple electronic documents, each inserted electronic bookmark indicating a beginning location of the respective accessed electronic document in the single electronic document file.

In some embodiments, a system may include an input-output device system and a data processing device system. The input-output device system may include a processor-accessible memory device system storing a program. The data processing device system may be communicatively connected to the input-output device system. and the processor-accessible memory device system. The program may include first access instructions configured to cause accessing of a first definition of a first set of document types associated with a first document-set type, the first definition stored by the processor-accessible memory device system. The first definition may identify at least multi-word-phrase characteristics associated with each document type in the first set of document types associated with the first document-set type. The program may include second access instructions configured to cause accessing of each of at least two electronic documents in a first set of multiple electronic documents stored by the processor-accessible memory device system. The first set of multiple electronic documents may be associated with the first document-set type. The program may include identification instructions configured to cause identification, for each accessed electronic document in the first set of multiple electronic documents, of a set of identified multi-word phrases determined to be in ordered text information in the accessed electronic document. Each multi-word phrase of the set of identified multi-word phrases may include adjacent words in the ordered text information. The program may include determination instructions configured to cause determination, for each accessed electronic document in the first set of multiple electronic documents, of a selected document type from the first set of document types based at least on an analysis of the set of identified multi-word phrases with respect to the multi-word-phrase characteristics identified by the first definition and associated with each document type in the first set of document types associated with the first document-set type. The program may include storage instructions configured to cause, for each accessed electronic document in the first set of multiple electronic documents, the processor-accessible memory device system to store an indication of the selected document type in association with each accessed electronic document.

Various embodiments of the present invention may include systems, devices, or machines that are or include combinations or subsets of any one or more of the systems, devices, or machines and associated features thereof described herein.

Further, all or part of any one or more of the systems, devices, or machines discussed herein or combinations or sub-combinations thereof may implement or execute all or part of any one or more of the processes or methods discussed herein or combinations or sub-combinations thereof.

For example, in some embodiments, a method is executed by a data processing device system communicatively connected to an input-output device system comprising a processor-accessible memory device system. The method may include accessing a first definition of a first set of document types associated with a first document-set type. The first definition may be stored by the processor-accessible memory device system. The first definition may identify at least multi-word-phrase characteristics associated with each document type in the first set of document types associated with the first document-set type. The method may include accessing each of at least two electronic documents in a first set of multiple electronic documents stored by the processor-accessible memory device system. The first set of multiple electronic documents may be associated with the first document-set type. The method may include identifying, for each accessed electronic document in the first set of multiple electronic documents, a set of identified multi-word phrases determined to be in ordered text information in the accessed electronic document. Each multi-word phrase of the set of identified multi-word phrases may include adjacent words in the ordered text information. The method may include determining, for each accessed electronic document in the first set of multiple electronic documents, a selected document type from the first set of document types based at least on an analysis of the set of identified multi-word phrases with respect to the multi-word-phrase characteristics identified by the first definition and associated with each document type in the first set of document types associated with the first document-set type. The method may include causing, for each accessed electronic document in the first set of multiple electronic documents, the processor-accessible memory device system to store an indication of the selected document type in association with each accessed electronic document.

Any of the features of all or part of any one or more of the methods or processes discussed herein may be combined with any of the other features of all or part of any one or more of the methods and processes discussed herein. In addition, a computer program product may be provided that comprises program code portions for performing some or all of any one or more of the methods or processes and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any of one or more of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of any of one or more of the methods or processes described herein.

For example, in some embodiments, a non-transitory computer-readable storage medium system includes one or more non-transitory computer-readable storage mediums storing a program executable by one or more data processing devices of a data processing device system communicatively connected to an input-output device system. The program may include a first access module configured to access a first definition of a first set of document types associated with a first document-set type. The first definition may be stored by a processor-accessible memory device system. The first definition may identify at least multi-word-phrase characteristics associated with each document type in the first set of document types associated with the first document-set type. The program may include a second access module configured to access each of at least two electronic documents in a first set of multiple electronic documents stored by the processor-accessible memory device system. The first set of multiple electronic documents may be associated with the first document-set type. The program may include an identification module configured to identify, for each accessed electronic document in the first set of multiple electronic documents, a set of identified multi-word phrases determined to be in ordered text information in the accessed electronic document. Each multi-word phrase of the set of identified multi-word phrases may include adjacent words in the ordered text information. The program may include a determination module configured to determine, for each accessed electronic document in the first set of multiple electronic documents, a selected document type from the first set of document types based at least on an analysis of the set of identified multi-word phrases with respect to the multi-word-phrase characteristics identified by the first definition and associated with each document type in the first set of document types associated with the first document-set type. The program may include a storage module configured to store, via the processor-accessible memory device system, an indication of the selected document type in association with each accessed electronic document in the first set of multiple electronic documents.

Further, any of one or more of the methods or processes and associated features thereof discussed herein may be implemented or executed by all or part of a device system, apparatus, or machine, such as all or a part of any of one or more of the systems, apparatuses, or machines described herein or a combination or sub-combination thereof.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

DETAILED DESCRIPTION

Figure 1:
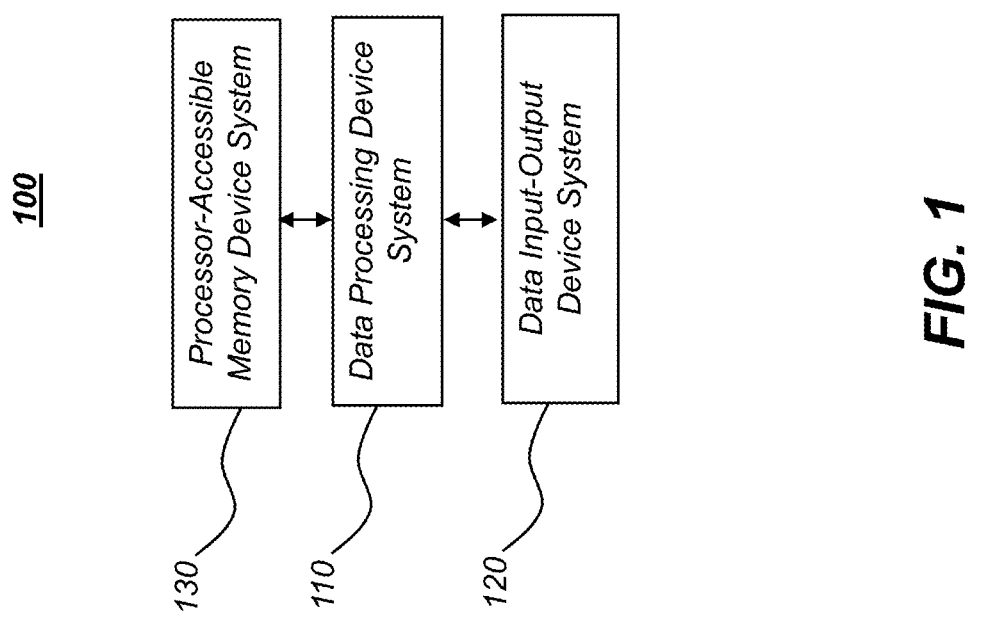
FIG. 1 illustrates a document processing system, according to some embodiments of the present invention.

At least some embodiments of the present invention improve upon document processing systems in the automobile industry and other industries by facilitating more time efficient processing of sets of electronic documents associated with a transaction as well as improving accuracy. For instance, in some embodiments, a data processing device system is configured to perform a multi-word phrase based analysis on each of at least some of such electronic documents to select a document type of each respective electronic document. For example, in some embodiments, a definition data structure is generated and populated to identify, for each of one or more document types, unique adjacent two-word phrases that have been found to appear in one or more electronic documents of the document type. Then, for example, when a new set of electronic documents, such as a deal jacket, is processed, adjacent two-word phrases are extracted from each document in the set of electronic documents and then compared to the definition to facilitate identification of the document type of each document in the new set of electronic documents, according to some embodiments. Although adjacent two-word phrases are discussed in this example, other embodiments utilize three-word or other multi-word phrases, e.g., with the same number-of-word phrases being implemented in the definition as extracted from the new set of electronic documents. This multi-word phrase-based analysis is believed to have a significant improvement in document-type identification success rate of an unknown electronic as compared to, e.g., a conventional document-type analysis that may merely analyze the graphical appearance of an electronic document in an attempt to match such appearance with that of a pre-defined document type. In some embodiments, the multi-word phrase-based analysis may be supplemented by image-based analysis to improve confidence levels in determined document types. According to some embodiments, highly efficient image-based analyses are described herein which are particularly suitable for supplementing multi-word phrase-based analyses by balancing image processing efficiency with sufficient matching recognition to sufficiently improve confidence levels in a multi-word phrase-based analysis. In some embodiments and in some contexts, the disclosed image-based analyses are particularly beneficial for use in lieu of a text-based analysis.

With the data processing device system identifying the document types of the electronic documents in the new set of electronic documents associated with a transaction, efficiency and accuracy of completion of quality control and other electronic document processes is improved as compared to conventional systems. In addition, in some embodiments, depending on the presence of one or more document types in the set of electronic documents, the data processing device system is configured to determine whether all required document types necessary to have a complete set of documents for the transaction are present. With certain document types identified as necessary, the data processing device system is configured to analyze the document types associated with the electronic documents in the set associated with the transaction to determine whether all necessary document types are present in the set to further improve efficiency and accuracy of completion of quality control and other electronic document processes as compared to conventional systems.

It should be noted that the invention is not limited to these or any other examples provided herein, which are referred to for purposes of illustration only. The above-discussed and other important features, benefits, and advantages are discussed herein and with reference to the drawings.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects. In addition, unless otherwise explicitly noted or required by context, the word "subset" is intended to mean a set having the same or fewer elements of those present in the subset's parent or superset.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, or device system resides across different housings. The word "device" may equivalently be referred to as a "device system" in some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted as a set of instructions or modules that may configure or be executed by one or more components in a system, such as a controller system or data processing device system, in order to cause the system to be configured to perform or to perform one or more operations. The set of instructions or modules may be stored by any kind of memory device, such as those described subsequently with respect to the memory device system 130 shown in FIG. 1. In addition, this disclosure may describe or similarly describe that the instructions or modules of a program are configured to cause the performance of an action. The phrase "configured to" in this and similar contexts is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. For another example, "image information Y" may undergo a noise filtering process, and a reference to "image information Y" is intended to include both the pre-processed form and the noise-filtered form, unless otherwise required or indicated by context. In other words, both the pre-processed form and the noise-filtered form are considered to be "image information Y", unless otherwise required or indicated by context. In order to stress this point, the phrase "or a derivative thereof" or the like may be used herein. Continuing the preceding example, the phrase "image information Y or a derivative thereof" refers to both the pre-processed form and the noise-filtered form of "image information Y", unless otherwise required or indicated by context, with the noise-filtered form potentially being considered a derivative of "image information Y". However, non-usage of the phrase "or a derivative thereof" or the like nonetheless includes derivatives or modifications of information or data just as usage of such a phrase does, as such a phrase, when used, is merely used for emphasis.

FIG. 1 schematically illustrates a document processing system 100, according to some embodiments of the present invention. The system 100 may include a data processing device system 110, an input-output device system 120, and a processor-accessible memory device system 130. The processor-accessible memory device system 130 and the input-output device system 120 are communicatively connected to the data processing device system 110.

The data processing device system 110 may include one or more data processing devices that implement or execute, in conjunction with other devices, such as those in the system 100, methods of various embodiments of the present invention, including the example methods of FIGS. 2-5 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad (Trademark Apple Inc., Cupertino Calif.), a personal digital assistant, a cellular phone, a smartphone, or any other device for processing data, managing data, or handling data, whether implemented with electrical, magnetic, quantum, optical, biological components, or otherwise.

The memory device system 130 includes one or more processor-accessible memory devices configured to store program instructions and other information, including the information and program instructions needed to execute the methods of various embodiments, including the example methods of FIGS. 2-5 described herein. In this regard, each of the elements (e.g., blocks, decision diamonds, or steps) illustrated in the example methods of FIGS. 2-5 may represent program instructions stored in the memory device system 130 and configured to cause execution of the respective method element (e.g., block, decision diamond, or step). In some embodiments, the data processing device system 110 is configured by a program stored in the processor-accessible memory device system 130 to execute the methods of FIGS. 2-5. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device or medium, whether volatile or nonvolatile, electronic, magnetic, optical, or otherwise, including but not limited to, registers, floppy disks, hard disks, Compact Discs, DVDs, flash memories, solid-state drives, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the processor-accessible memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system or data storage medium system including or consisting of one or more non-transitory processor-accessible (or computer-readable) storage or data storage mediums.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 may be implemented by a single application-specific integrated circuit (ASIC) in some embodiments.

The input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving a selection, information, instructions, or any other data from other devices or systems described in various ones of the embodiments.

The input-output device system 120 also may include an image generating device system, a display device system, a speaker device system, a computer, a processor-accessible memory device system, a network-interface-card or network-interface circuitry, or any device or combination of devices to which information, instructions, or any other data is output by the data processing device system 110. In this regard, the input-output device system 120 may include various other devices or systems described in various embodiments. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

FIGS. 2-5 illustrate methods of determining a document type of a computer-readable document based at least on an analysis of multi-word phrases in the computer-readable document. It should be noted that the invention is not limited to the existence of all or the ordering of steps or elements of the methods illustrated in these figures, and that various embodiments may exclude one or more of such steps or elements or may include different orderings of such steps or elements.

Figure 2:
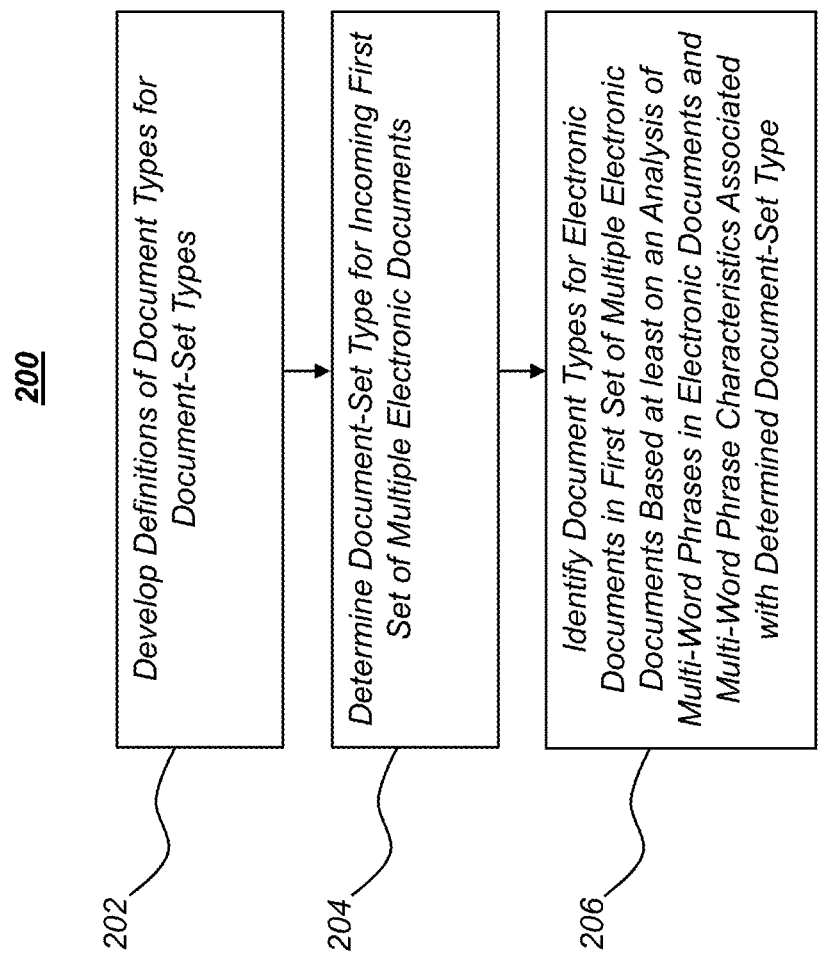
FIG. 2 illustrates a method of determining a document type of a computer-readable document based at least on an analysis of multi-word phrases in the computer-readable document, which method may be implemented or executed by the system of FIG. 1, or for which the system of FIG. 1 may be configured to implement or execute by way of computer program instructions, according to some embodiments of the present invention.

FIG. 2 illustrates a method 200 implementing a multi-word-phrase-based analysis of electronic documents, according to some embodiments of the present invention. An electronic document may be a PDF document, a part of a PDF document, or all or part of any other computer-accessible document in computer-readable form. In this regard, an electronic document may be a single page document or a multi-page document. While this description often refers to "electronic documents", which might imply implementation utilizing electricity and a binary format, the present invention is not limited to such a particular implementation of computer-readable documents. For example, some embodiments of the present invention include computer-accessible documents in computer-readable form implemented at least in part by quantum, optical, or biological computing systems, which may or may not be limited to binary states.

As illustrated by block 202, the method 200 may include developing definitions of document types for document-set types. As discussed in more detail below at least with respect to FIG. 6, a document-set type may be a data structure (e.g., 602 or 604 in FIG. 6) that defines at least a set of one or more individual document types. For example, in some embodiments pertaining to the automobile industry, a first document-set type may define some or all individual document types that may be present in a single automobile transaction involving one particular automobile dealer. A second document-set type may define some or all individual document types that may be present in a single automobile transaction involving a different automobile dealer. However, in other embodiments, each document-set type may define some or all individual document types that may be present in a different type of transaction, besides an automobile transaction, involving a different type of entity, besides an automobile dealer, or involving a different type of industry, besides the automobile industry.

In this regard, block 202 may be associated with a development of a document-set type (e.g., 602, 604 in FIG. 6 discussed in more detail below) for each of a plurality of industries, entities, or both, with each document-set type not only identifying each of a set of one or more individual document types (e.g., 612, 614, 622, 624 in FIG. 6 discussed in more detail below) that may be present in a transaction associated with the industry, entity, or both, but also defining characteristics, such as multi-word-phrase characteristics (e.g., 616, 618, 626, 628 in FIG. 6 discussed in more detail below), for each individual document type. Example implementations of the processing associated with block 202 are discussed in more detail below at least with respect to FIG. 3.

As illustrated by block 204 in FIG. 2, the method 200 may include determining a document-set type for an incoming first set of multiple electronic documents. For example, in some embodiments pertaining to the automobile industry, the first set of multiple electronic documents may be all documents that were involved in an automobile transaction, such as the purchase or lease of an automobile from a particular automobile dealer. In the automobile industry, the set of all documents that were involved in an automobile transaction is referred to as a "deal jacket". In this regard, the particular automobile dealer may desire that the deal jacket be analyzed to ensure, among other things, that all necessary documents are present in the deal jacket. However, in some embodiments, the system (e.g., system 100) performing such an analysis may be analyzing deal jackets from multiple different automobile dealers. Accordingly, block 204 may be associated with the system 100 analyzing an incoming unknown deal jacket to determine which automobile dealer (e.g., identified by a particular document-set type) is associated with the incoming unknown deal jacket. Of course, it is reiterated that the processing associated with block 204 is not limited to the automobile industry or automobile dealers, which are referred to herein for illustration purposes only. Example implementations of the processing associated with block 204 are discussed in more detail below at least with respect to FIG. 4.

As illustrated by block 206 in FIG. 2, the method 200 may include identifying document types for electronic documents in the first set of multiple electronic documents based at least on an analysis of multi-word phrases (e.g., 712 or 714 in FIG. 7, discussed in more detail below) in each of such electronic documents and multi-word phrase characteristics (e.g., 616, 618 in FIG. 6, discussed in more detail below) associated with the document-set type determined according to the processing associated with block 204. For example, in some embodiments associated with the automobile industry, the processing associated with block 206 may include comparing multi-word phrases in each respective electronic document in a deal jacket associated with a particular automobile dealer with the multi-word-phrase characteristics associated with each document type defined by the document-set type associated with the particular automobile dealer, in order to determine which document type should be associated with the respective electronic document. Accordingly, in some embodiments, the processing associated with block 206 may output, among other things, an identification of a document type for each electronic document in the first set of multiple electronic documents.

Such information is useful to, among other things, make subsequent analysis of the electronic documents in the first set of multiple electronic documents more efficient. For example, in some embodiments associated with the automobile industry, the processing associated with 206 may provide visual output to a user or some other indication, e.g., to subsequent downstream processes, linking one electronic document in the deal jacket (an example of the first set of multiple electronic documents) with a buy order (an example of one possible document type) and another electronic document in the deal jacket with a request for financing (an example of another possible document type). With this information, the user or downstream process may be able to more efficiently further analyze each electronic document, such as by at least (a) ensuring that the buy order electronic document meets all of the requirements associated with a proper buy order, (b) ensuring that the request-for-financing electronic document meets all the requirements associated with a proper request for financing, (c) ensuring that the purchaser data on the buy order electronic document matches the purchaser data on the financing electronic document, or a combination or sub-combination of (a), (b), and (c).

For another example, in some embodiments, the processing associated with block 206 includes determining whether or not the first set of multiple electronic documents includes all document types indicated as necessary (e.g., 617, 619, 627, 629 in FIG. 6, discussed in more detail below) by the definitions associated with the document-set type determined according to the processing associated with block 204. In this regard, having identified a document type associated with each electronic document in the first set of multiple electronic documents, the system 100 is now able to determine whether or not the first set of multiple electronic documents has all necessary document types to be proper. In the context of the automobile industry, if the output of the processing associated with block 206 reveals that there is no electronic document in the first set of multiple electronic documents having a "buy order" document type indicated as necessary, an error or warning notification may be provided to a user. Example implementations of the processing associated with block 206 are discussed in more detail below at least with respect to FIG. 5.

Figure 3:
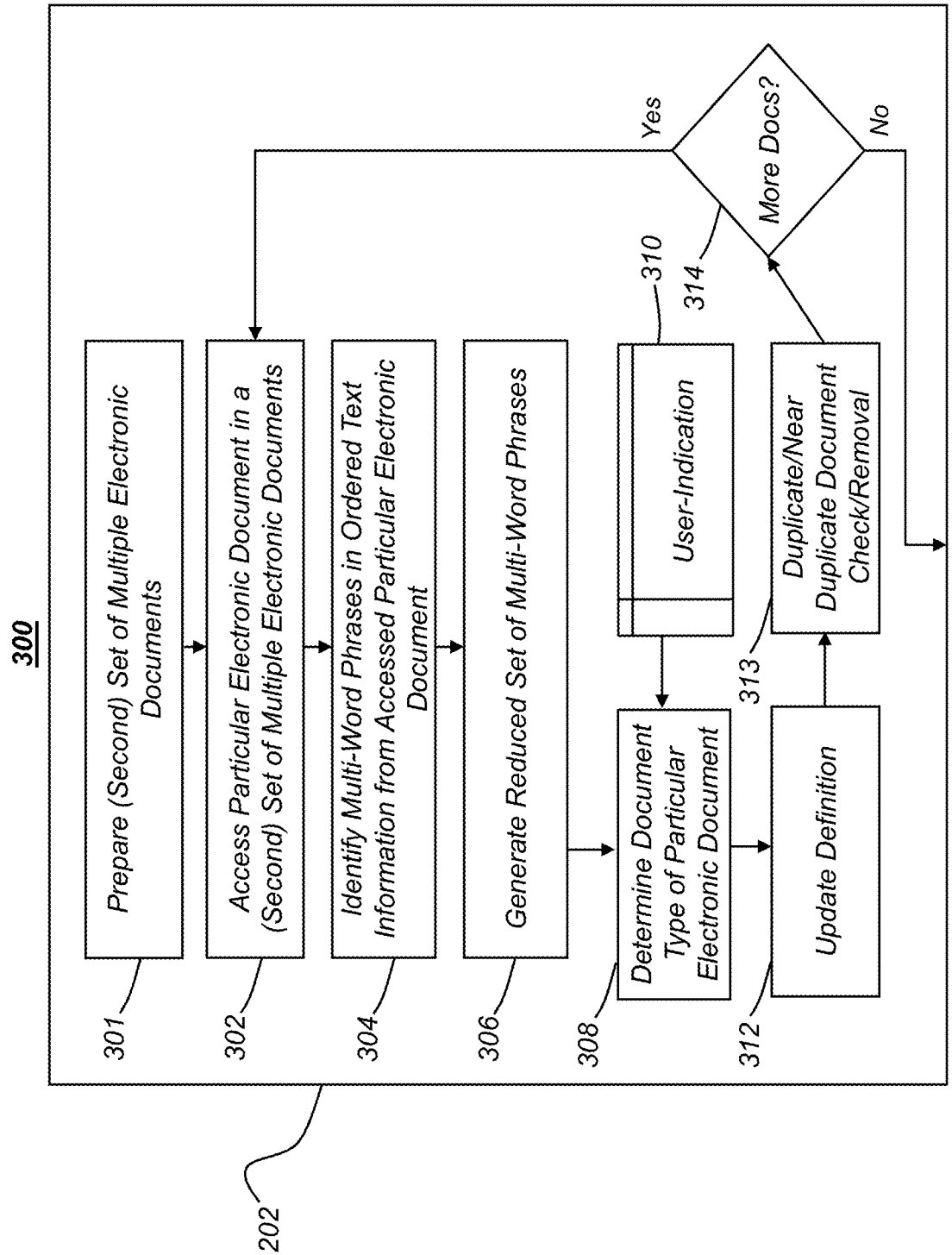
FIG. 3 illustrates particular implementations of a first portion of the method of FIG. 2, according to some embodiments of the present invention.
Figure 6:
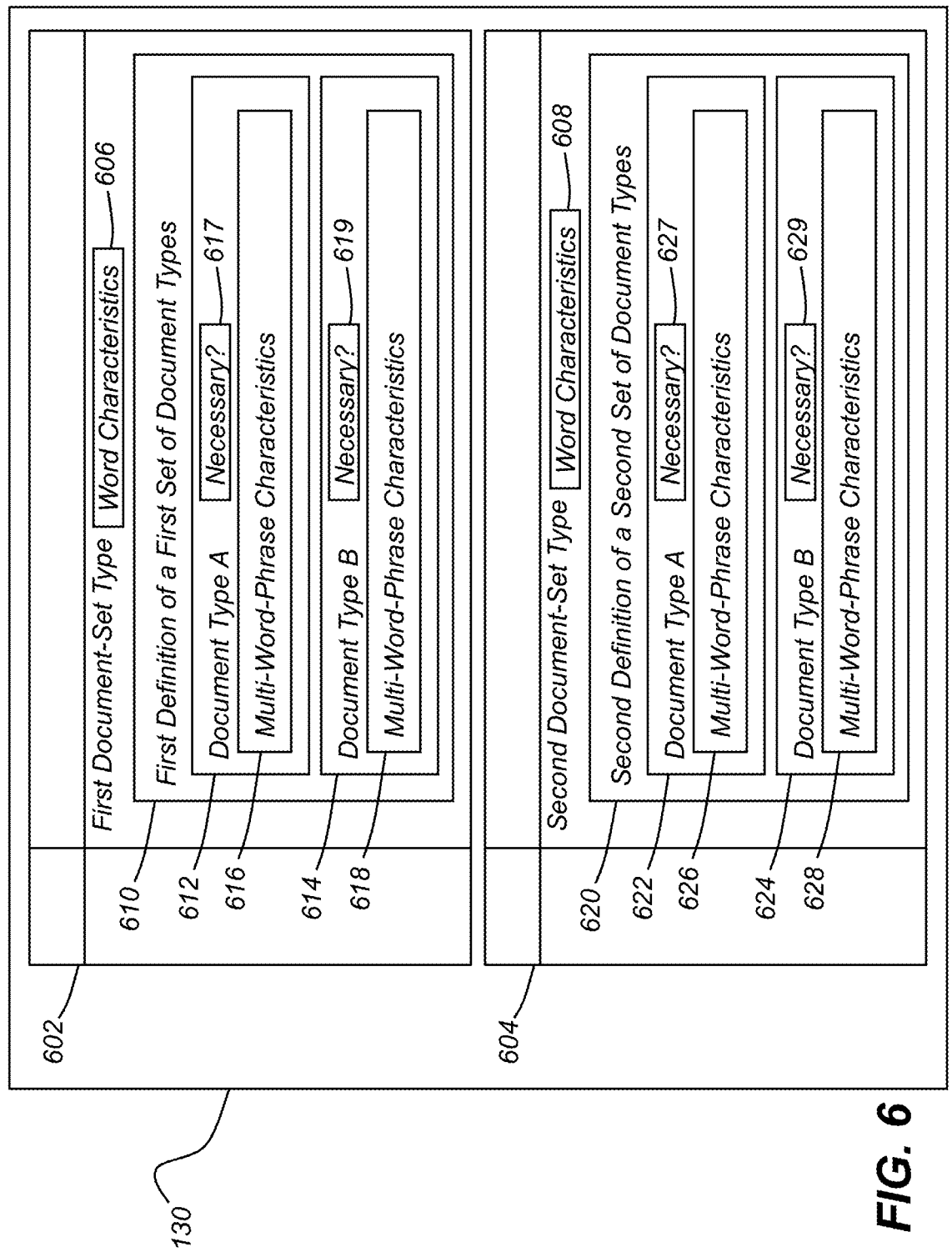
FIG. 6 illustrates data structure architecture and data stored according to such architecture by a processor-accessible memory device system of the system of FIG. 1, the data structure architecture and the data defining at least document types to facilitate implementation or execution of at least a portion of the method of FIG. 2, according to some embodiments of the present invention.

Turning now to FIG. 3, a method 300 is illustrated, which provides example implementations of the processing associated with block 202 in FIG. 2, according to some embodiments. The method 300 may be associated with a generation and population of document-set type data structures 602, 604 shown, for example, in FIG. 6. Data structure 602 is associated with a first document-set type, and data structure 604 is associated with a second document-set type, according to some embodiments. Although FIG. 6 illustrates only two document-set types 602, 604 for clarity, it is noted that any number of document-set types may be implemented according to various embodiments. Upon generation, the data structures 602, 604 are stored by the processor-accessible memory device system 130, according to some embodiments.

Figure 7:
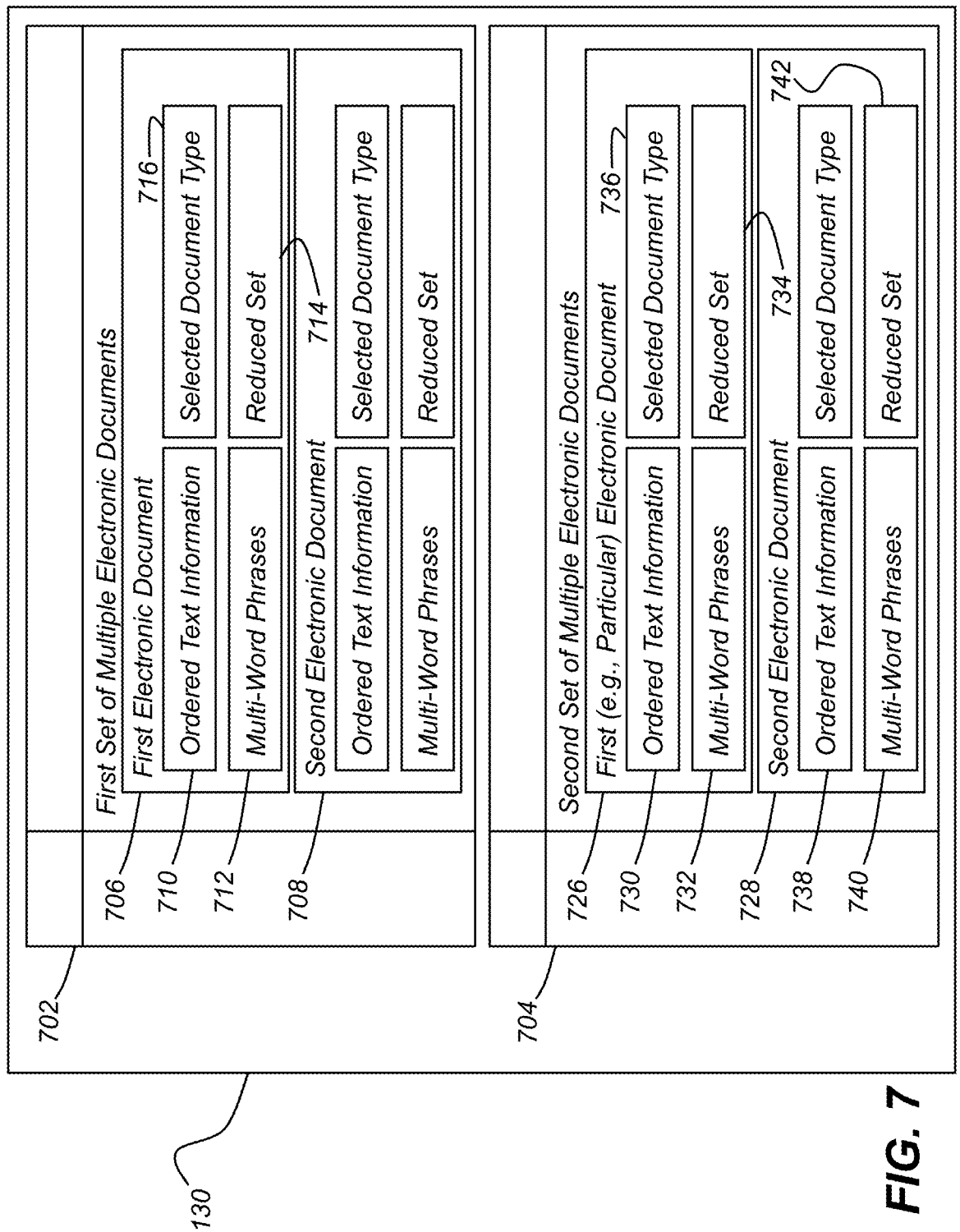
FIG. 7 illustrates data structure architecture and data stored according to such architecture by a processor-accessible memory device system of the system of FIG. 1, the data structure architecture and the data identifying at least multi-word phrases in a computer-readable document to facilitate implementation or execution of at least a portion of the method of FIG. 2, according to some embodiments of the present invention.

In some embodiments, in order to generate and populate the document-set type data structures 602, 604, electronic documents 726, 728 in FIG. 7 in a set of multiple electronic documents 704 are accessed and analyzed. Although FIG. 7 illustrates only two electronic documents 726, 728 for purposes of clarity, it is noted that the set of multiple electronic documents 704 may include any number of electronic documents. Such a set of multiple electronic documents 704, which is accessed and analyzed in order to generate and populate the document-set type data structures 602, 604, is sometimes referred to herein as a "second" set of multiple electronic documents 704, as indicated by the use of parentheses in blocks 301 and 302 in FIG. 3. In this regard, the use of the label "second" is merely for differentiation purposes and not necessarily to indicate a specific ordering between sets of multiple electronic documents. The second set of multiple electronic documents 704 may be mutually exclusive with the first set of multiple electronic documents 702. For example, the second set of multiple electronic documents 704 that are analyzed to develop a document type definition (e.g., the first definition 610) may be mutually exclusive with electronic documents (e.g., the first set of multiple electronic documents 702) that are analyzed to determine their document types according to the defined definition as discussed in more detail below at least with respect to FIG. 5.

As indicated by block 301, the method 300 may include preparing the second set of multiple electronic documents 704 that will be subsequently processed to generate and populate a document-set type data structure, such as data structure 602 in FIG. 6, including developing a corresponding document type definition (e.g., first definition 610). In some embodiments, the computer-executable instructions associated with block 301 may include ensuring that no duplicate (or near duplicate, possibly with user consent) electronic documents exist in the second set of multiple electronic documents 704, in order to help ensure successful operation of a "rule (b)" discussed in more detail below, which causes removal of duplicate phrases among different documents in the second set of multiple electronic documents 704. In this regard, the second set of multiple electronic documents 704 may be non-identical documents associated with a document-set type. Some example embodiments of eliminating duplicate or near duplicate documents are provided below with respect to block 313. Accordingly, such processes of eliminating duplicate or near duplicate documents may occur as a preliminary process, e.g., according to block 301, or may be a process iteratively performed, e.g., according to block 313, in conjunction with the processes of determining document types, which are described in more detail below with respect to blocks 306 and 308.

As indicated by block 302, the method 300 may include accessing a particular electronic document 726 in the second set of multiple electronic documents 704 to begin the process of generating and populating a document-set type data structure, such as data structure 602 in FIG. 6. In this regard, the second set of multiple electronic documents 704, including the particular electronic document 726, may be stored by the processor-accessible memory device system 130. The second set of multiple electronic documents 704 may represent a digitally scanned version of counterpart physical (e.g., paper) documents. For example, in the context of the automobile industry, a physical deal jacket including multiple paper documents may have been electronically scanned and saved by the processor-accessible memory device system 130 as the second set of multiple electronic documents 704. Electronic documents 726, 728 in the second set of multiple electronic documents 704 may be stored as PDF documents, as parts of a larger PDF document, or all or part of any other electronic document format known in the art. The processing associated with block 302 may include the data processing device system 110 retrieving the particular electronic document 726 in the second set of multiple electronic documents 704 via the processor-accessible memory device system 130.

Figure 8:
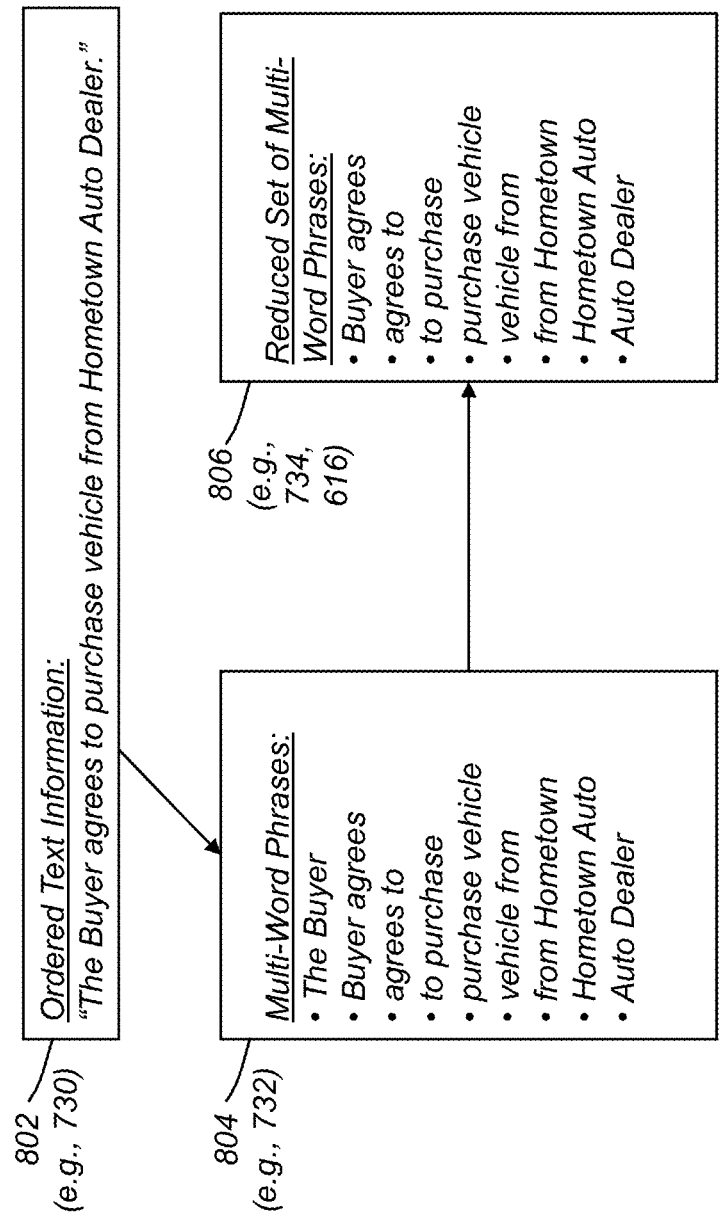
FIG. 8 illustrates text information and multi-word-phrase information in a computer-readable document that is processed to generate multi-word-phrase characteristics stored in a document type definition of FIG. 6, according to some embodiments of the present invention.

As indicated by block 304, the method 300 may include identifying multi-word phrases 732 in ordered text information 730 from the accessed particular electronic document 726. The ordered text information 730 from the accessed particular electronic document 726 may be generated by performing optical character recognition ("OCR"), or other text-recognition processes known in the art, on the particular electronic document 726. FIG. 8 illustrates ordered text information 802 as a simplified example of ordered text information 730 for purposes of illustration.

In some embodiments associated with block 304, the multi-word phrases 732 are identified by the data processing device system 110 from the ordered text information 730 as adjacent two-word pairs in the ordered text information 730. In the example of FIG. 8, the data processing device system 110 is configured by program instructions associated with block 304 to scan the ordered text information 802 and extract adjacent two-word pairs to build the multi-word phrases 804. In this regard, the multi-word phrases 804 are a simplified example of multi-word phrases 732 for purposes of illustration. Also in the example of FIG. 8, it can be seen that the data processing device system 110 is configured to extract the adjacent two-word pairs in a manner that a word instance is present in two extracted phrases. For example, the word instance "Buyer" is present in the multi-word phrases "The Buyer" and "Buyer agrees".

In this regard, the phrase "word instance" is intended to refer to a word in the ordered text information by the word's unique location in the ordered text information. For example, the word "The" in the ordered text information 802 is the first word instance in the ordered text information. The word "Buyer" in the ordered text information 802 is the second word instance in the ordered text information. By referring to word instances, identical words (e.g., multiple usages of the word "the" in ordered text information) may be distinguished from each other by their locations in the ordered text information.

In some embodiments, the data processing device system 110 is configured to extract the adjacent two-word pairs in a manner that each word instance, except for a first and last word instance in the ordered text information, and except for any word instance adjacent an invalid word, is present in two extracted phrases. For example, the word "The" in the ordered text information 802 is the first word instance in the ordered text information 802 and, consequently, only appears in one multi-word phrase in the multi-word phrases 804. As discussed in more detail below with respect to the generation of a reduced set of multi-word phrases, an invalid word may be a word not present in a predetermined dictionary (e.g., a misspelled or word improperly recognized by OCR).

In some contexts, the utilization of adjacent two-word pairs may in the manner described may be beneficial in that it may provide a particularly suitable balance of efficiency of processing (longer phrases or non-adjacent phrases may increase processing complexity) while providing a sufficient number of phase-matches (e.g., as described in more detail below with respect to at least block 508 in FIG. 5) to efficiently and with good accuracy identify or select document types for electronic documents. Further, identifying adjacent words may improve phrase-matching performance (e.g., as described in more detail below with respect to at least block 508 in FIG. 5) as compared to an implementation that identifies multi-word phrases including non-adjacent words. However, some embodiments of the present invention include multi-word phrases beyond two adjacent words, e.g., three or more adjacent words, for example, in some contexts where processing complexity is less of a concern. Further in this regard, some embodiments of the present invention generate multi-word phrases to include non-adjacent words that are separated by a fixed number of words, e.g., a pair of words separated by one word, such as the phrases "The brown", "quick fox", and "brown jumped" in the sentence "The quick brown fox jumped". Such an approach including non-adjacent words separated by a fixed number of words may be implemented in contexts where it is beneficial for phrase-matching performance.

As indicated by block 306 in FIG. 3, the method 300 may include generating a reduced set of multi-word phrases 734 shown in FIG. 7. In some embodiments, the reduced set of multi-word phrases 734 includes or is a set of distinct multi-word phrases that excludes non-distinct multi-word phrases among multiple electronic documents of the same document-set type. In some embodiments, the data processing device system 110 is configured by program instructions associated with block 306 to remove, from the multi-word phrases 732, (a) any multi-word phrase including a word not present in a predetermined dictionary (referred to herein as "rule (a)"), (b) any multi-word phrase present or that occurs in the multi-word phrases (e.g., multi-word phrases 740) in ordered text information in any of at least one other or all other electronic documents (e.g., electronic document 728) in the set of multiple electronic documents being analyzed (e.g., at least a subset of the second set of multiple electronic documents 704, which is associated with a same document-set type (e.g., the first document-set type 602)) (referred to herein as "rule (b)"), or both (a) and (b). In some embodiments, the predetermined dictionary is a dictionary of words in the particular language being utilized, which is the English language in this example.

Continuing with the example of FIG. 8, the data processing device system 110 is configured by program instructions to determine that every word in the ordered text information 802 is present in its predetermined English-language dictionary. Accordingly, no multi-word phrase from multi-word phrases 804 is removed due to rule (a). In order to check for rule (b), however, the data processing device system 110 builds a set of multi-word phrases for each other electronic document (i.e., the second electronic document 728 in the example of FIG. 7) in the second set of multiple electronic documents 704.

Figure 9:
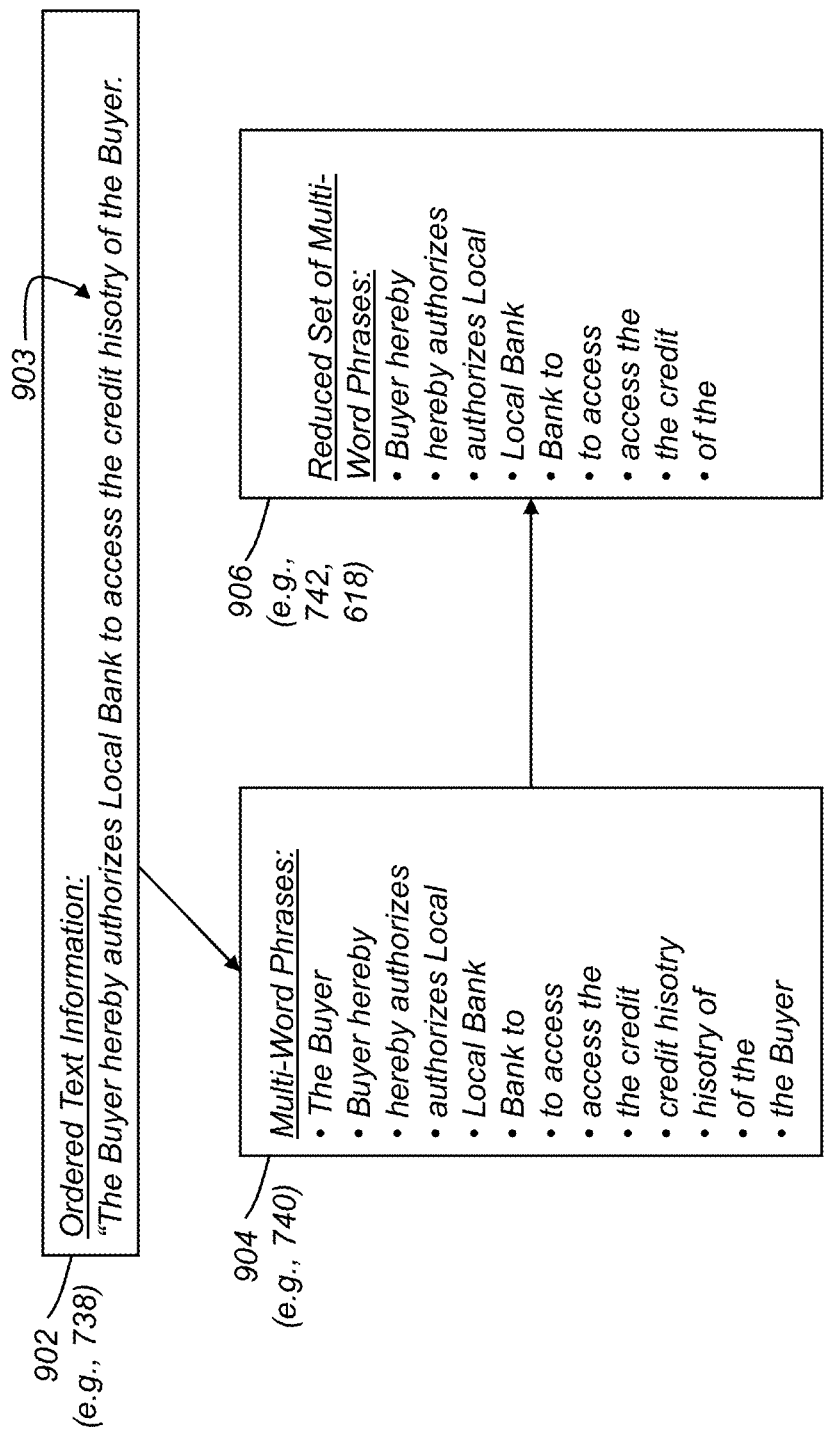
FIG. 9 illustrates text information and multi-word-phrase information in a computer-readable document that is processed to generate multi-word-phrase characteristics stored in a document type definition of FIG. 6, according to some embodiments of the present invention.

In this regard, FIG. 9 illustrates processing by the data processing device system 110 to generate multi-word phrases 904 from ordered text information 902, which is a simplified example of ordered text information 738 associated with second electronic document 728 for purposes of illustration. Accordingly, the multi-word phrases 904 are a simplified example of multi-word phrases 740 associated with second electronic document 728 for purposes of illustration.

Having the multi-word phrases generated for every electronic document in the second set of multiple electronic documents 704, the data processing device system 110 may scan the ordered text information 802 for compliance with the above-discussed rule (b), where the multi-word phrases 804 are compared with the multi-word phrases of every other electronic document (only electronic document 728 in this simplified example) in the second set of multiple electronic documents 704. Accordingly, in some embodiments associated with block 306 in FIG. 3, the data processing device system 110 is configured by program instructions to compare multi-word phrases 804 with multi-word phrases 904. In this regard, the data processing device system 110 is configured to determine that the multi-word phrase "The Buyer" appears in both the multi-word phrases 804 and 904. Therefore, according to the above-discussed rule (b), the phrase "The Buyer" is removed from multi-word phrases 804 when generating the reduced set of multi-word phrases 806, which is a simplified example of the reduced set of multi-word phrases 734.

Since rule (b) seeks removal of duplicate phrases among different documents in the second set of multiple electronic documents 704, the optional block 301 in FIG. 3 discussed above, which pertains to ensuring that duplicate documents do not exist in the second set of multiple electronic documents 704, can be beneficial in at least some of the embodiments implementing such rule (b). To elaborate, if duplicate documents exist in the second set of multiple electronic documents 704, phases between the identical or nearly identical documents may be determined as duplicates and removed, which may skew results.

Having generated the reduced set of multi-word phrases according to the processing associated with block 306, the data processing device system 110 receives, via the data input-output device system 120 (e.g., via a mouse, keyboard, touchscreen or other data input device interaction), a user-indication 310 indicating a user-identified document type associated with the particular electronic document 726. In some embodiments, the user-indication 310 may also include an indication of the document-set type associated with the particular electronic document 726. With such user-indication 310, and as illustrated by block 308, the method 300 includes determining the document type of the particular electronic document 726, according to some embodiments. In the automobile industry context, the user-indication 310 may indicate that the particular electronic document 726 is a buyer order from an entity "Hometown Auto Dealer", and the data processing device system 110 may consequently register the selected document type 736 of the particular electronic document 726 as a buyer order and the document-set type associated with the particular electronic document 726 (and the remainder of the electronic document(s) in the second set of multiple electronic documents 704) as "Hometown Auto Dealer". In this regard, processing associated with block 308 may include determining the document-set type (e.g., the first document-sent type 602) associated with the entirety of the second set of multiple electronic documents 704.

With the reduced set of multi-word phrases, which were generated according to program instructions associated with block 306, and the document type and document-set type, which were determined according to program instructions associated with block 308, the method 300 includes, as illustrated by block 312, generating (if not already generated) a first document-set type 602 associated with the entity "Hometown Auto Dealer" and populating or updating a first definition 610 of a first set of document types to include a document type A 612, which may be user-identified via user-indication 310, and which, in the preceding automobile industry example, may refer to a buyer order. The multi-word-phrase characteristics 616 document type A 612 may include the reduced set of multi-word phrases 734 or, in the example of FIG. 8, the reduced set of multi-word phrases 806. In some embodiments, at least some of the multi-word phrases (e.g., the reduced set of multi-word phrases 734 from the larger set of multi-word phrases 732) are included in the multi-word-phrase characteristics (e.g., multi-word-phrase characteristics 616) associated with the document type (e.g., document type A 612) identify by a user (e.g., via user-indication 310). In some embodiments, the multi-word-phrase characteristics 616 associated with a particular document type (e.g., document type A 612) include a set of defined multi-word phrases (e.g., the reduced set of multi-word phrases 734 or 806) for ordered text (e.g., ordered text information 730 or 802) within an electronic document of the particular document type.

In the above example where document type A 612 is a buyer order, such a buyer order or other document type may be a type of document that includes multiple pages. Accordingly, in some embodiments, each of one or more of the document types (e.g., document type A 612, document type B 614) in a set of document types (e.g., the first set of document types defined by the first definition 610), is associated with multiple pages (e.g., document type A 612 may be a buyer order that is the type of document that includes multiple pages). However, a document type need not refer to an entire multi-page document and may refer to a particular page of a multi-page document. For example, document type A 612 may be referred to as "buyer order page 1", and document type B 614 may be referred to as "buyer order page 2", etc. Accordingly, in some embodiments, at least some document types in the set of document types (e.g., the first set of document types defined by the first definition 610) may be associated with a single page electronic document (e.g., page 1 of a buyer order). With such a page-by-page implementation, document types of electronic documents may be identified with increased granularity, which may be beneficial in some contexts.

In at least some embodiments where document types (e.g., the document type A 612 and the document type B 614) are page-based document types like those discussed above (e.g., "page 1 buyer order") the multi-word-phrase characteristics (see, multi-word-phrase characteristics 616) associated with at least a particular document type (e.g., document type A 612) include page-based multi-word-phrase characteristics associated with a single document page, where, e.g., the multi-word-phrase characteristics include a set of identified multi-word phrases (e.g., the multi-word phrases 732 or the reduced set of multi-word phrases 734) associated with a single document page (e.g., in a case where the particular electronic document 726 is itself a single page document).

In some embodiments, after populating or updating the definition (e.g., the first definition 610) of the first set of document types according to the program instructions associated with block 308, the method 300 may include checking the set of multiple electronic documents (e.g., the second set of multiple electronic documents 704) to determine whether or not any documents exist in the set that are duplicative or near-duplicative of the particular electronic document accessed according to block 302 (e.g., the particular electronic document 726 in this example). In other words, as described above, it may be beneficial in some embodiments to ensure that no two documents in the training set have the same document type to prevent skewing of results according to the above-discussed rule (b). In some embodiments, program instructions according to block 313 configure the data processing device system 110 to generate the reduced set of multi-word phrases according to block 306 for each document in the set of multiple electronic documents (e.g., the second set of multiple electronic documents 704). In this regard, the program instructions associated with block 306 (and block 304) may be preliminarily performed as part of preparing the set of multiple electronic documents according to block 301. With the reduced set of multi-word phrases generated for all documents in the set of multiple electronic documents (e.g., the second set of multiple electronic documents 704), the program instructions associated with block 313 may configure the data processing device system 110 to compare the reduced set of multi-word phrases for the present document being analyzed (e.g., the particular electronic document 726 in this example) with the reduced set of multi-word phrases for at least each remaining document in the set of multiple electronic documents (e.g., the second set of multiple electronic documents 704). If there is a match of multi-word phrases within a threshold amount or percentage, the matching documents may be deemed by the data processing device system 110 to be identical (duplicative) or near-identical (near-duplicative) according to the program instructions associated with block 313. For example, if there is at least a 90% match, in some embodiments (other embodiments use other percentage thresholds), between the reduced set of multi-word phrases associated with the present document being analyzed (e.g., the particular electronic document 726 in this example) and a second document in the set of multiple electronic documents, the data processing device system 110 may be configured by the program instructions associated with block 313 to determine that the two documents are identical or near-identical and, consequently, to remove the second document from the set of multiple electronic documents (e.g., the second set of multiple electronic documents 704).

Of course, block 313, like other blocks represented in the figures, need not be located in the particular portion of the process illustrated, and may occur at one or more other locations in the method 300. For instance, in some embodiments, the locations of blocks 312 and 313 may be swapped.

As shown by decision diamond 314, upon completion of the processing associated with block 312 (or block 313 in some embodiments in which that block is included in method 300), the method 300 may be repeated (e.g., beginning again with block 302) for each other electronic document, e.g., electronic document 728, in the set of multiple electronic documents being processed, e.g., the second set of multiple electronic documents 704. To continue the preceding example, execution of the method 300 on the electronic document 728 would result in generation of document type B 614, with the multi-word-phrase characteristics 618 including the reduced set of multi-word phrases 742 or, in the example of FIG. 9, the reduced set of multi-word phrases 906. In this regard, it can be seen at the ordered text information 902 includes a misspelling of the word "history", as shown by reference 903. Accordingly, each multi-word phrase in the multi-word phrases 904 that includes such misspelling are removed when generating the reduced set of multi-word phrases 906 according to the processing associated with block 306, since the misspelled word is not present in the predetermined English-language dictionary. In addition, the phrase "The Buyer" is removed from the multi-word phrases 904 when generating the reduced set of multi-word phrases 906 according to the processing associated with block 306, since such phrase is present in the multi-word phrases 804 of the first electronic document 726.

Accordingly, the reduced set of multi-word phrases (e.g., 734 or 742) may represent multi-word phrases that only include valid word instances, where "valid" may be defined in this context to be word instances that are present in the predetermined dictionary. Further, the reduced set of multi-word phrases may represent multi-word phrases that are not present in any other electronic document in the same set of multiple electronic documents.

As will be discussed in more detail below, the multi-word-phrase characteristics (e.g., 616, 618), which include the reduced set of multi-word phrases (e.g., 734, 742, respectively), according to some embodiments, are utilized by the data processing devices 110 to identify document types of unknown electronic documents. Accordingly, generating the reduced set of multi-word phrases according to block 306 is beneficial at least in some contexts because it increases the uniqueness of their respective multi-word-phrase characteristics of the respective document type, thereby increasing the accuracy by which document types of unknown electronic documents are determined. In this regard, the multi-word-phrase characteristics (e.g., 616, 618) are associated with each document type (e.g., 612, 614) in the respective set of document types (e.g., the first set of document types defined by the first definition 610).

According to some embodiments, the processing associated with block 312 may include populating word characteristics 606 associated with the first document-set type 602. In some embodiments, the word characteristics 606 may be associated with the entity or industry name associated with the first document-set type. In the example where the user-indication 310 identifies the first document-set type 602 as "Hometown Auto Dealer", the data processing device system 110 may be configured to populate the word characteristics 606 to include the words or phrase "Hometown Auto Dealer". As discussed in more detail below, the data processing device system 110 is configured by program instructions to utilize such word characteristics 606 as a tool to identify a document-set type of a subsequently processed unknown set of multiple electronic.

In some embodiments, the first definition 610 may identify each document type (e.g., document type A 612 and document type B 614) of the first set of document types as "necessary" to have a valid set of multiple electronic documents or "not necessary" (e.g., optional) to have a valid set of multiple electronic documents. In this regard, at least a subset of the first set of document types defined by the first definition 602 may be identified as "necessary". Such information may be provided by a user e.g., via user-indication 310, or otherwise determined as discussed in more detail below with respect to at least block 516 in FIG. 5. The data processing device system 110 may be configured by program instructions associated with block 516 to cause the processor-accessible memory device system 130 to store an indication of whether or not each document type is necessary, for example, in data fields 617, 619. Utilization of this information is described in more detail below at least with respect to block 520 in FIG. 5.

As illustrated in FIG. 6, the method 300 may be repeated for electronic documents of a second document-set type 604, resulting in the population of the corresponding word characteristics 608 and a second definition 620 of a second set of document types, including document types 622, 624 and their respective multi-word-phrase characteristics 626, 628. Although the example of FIG. 6 shows the second definition 620 including the same document types 622, 624 as respective document types 612, 614 in the first definition 610, this may not be the case, and different document-set types may define different pluralities of document types.

In a case where different document-set types include a same document type (e.g., like document-set types 612, 622), the respective multi-word-phrase characteristics (e.g., multi-word-phrase characteristics 616, 626) may be different for the same document type between the different document-set types and their respective included definitions. For example, the multi-word-phrase characteristics 616 of the buyer order document type 612 (in this example) may include the reduced set of multi-word phrases 806, which include the multi-word phrases "from Hometown", "Hometown Auto", and "Auto Dealer". In this example, these phrases are included in the multi-word-phrase characteristics 616, because the first document-set type 602 is associated with the entity "Hometown Auto Dealer". However, the second document-set type 604 may be associated with a different entity other than "Hometown Auto Dealer". Accordingly, the buyer order document type 622 (in this example) would not have the phrases "from Hometown", "Hometown Auto", and "Auto Dealer" in its multi-word-phrase characteristics 626. For at least this reason, multi-word-phrase characteristics (e.g., multi-word-phrase characteristics 616, 626) for a same document type across different document-set types (e.g., document-set types 602, 604) and, consequently may be different across their definitions (e.g., definitions 610, 620, respectively), according to some embodiments.

Also, although FIG. 6 illustrates each definition (e.g., first definition 610 and second definition 620) including a set of multiple document types, some embodiments of the present invention have at least one definition including only a single document type, e.g., in a case where first definition 610 only includes document type A 612.

Figure 4:
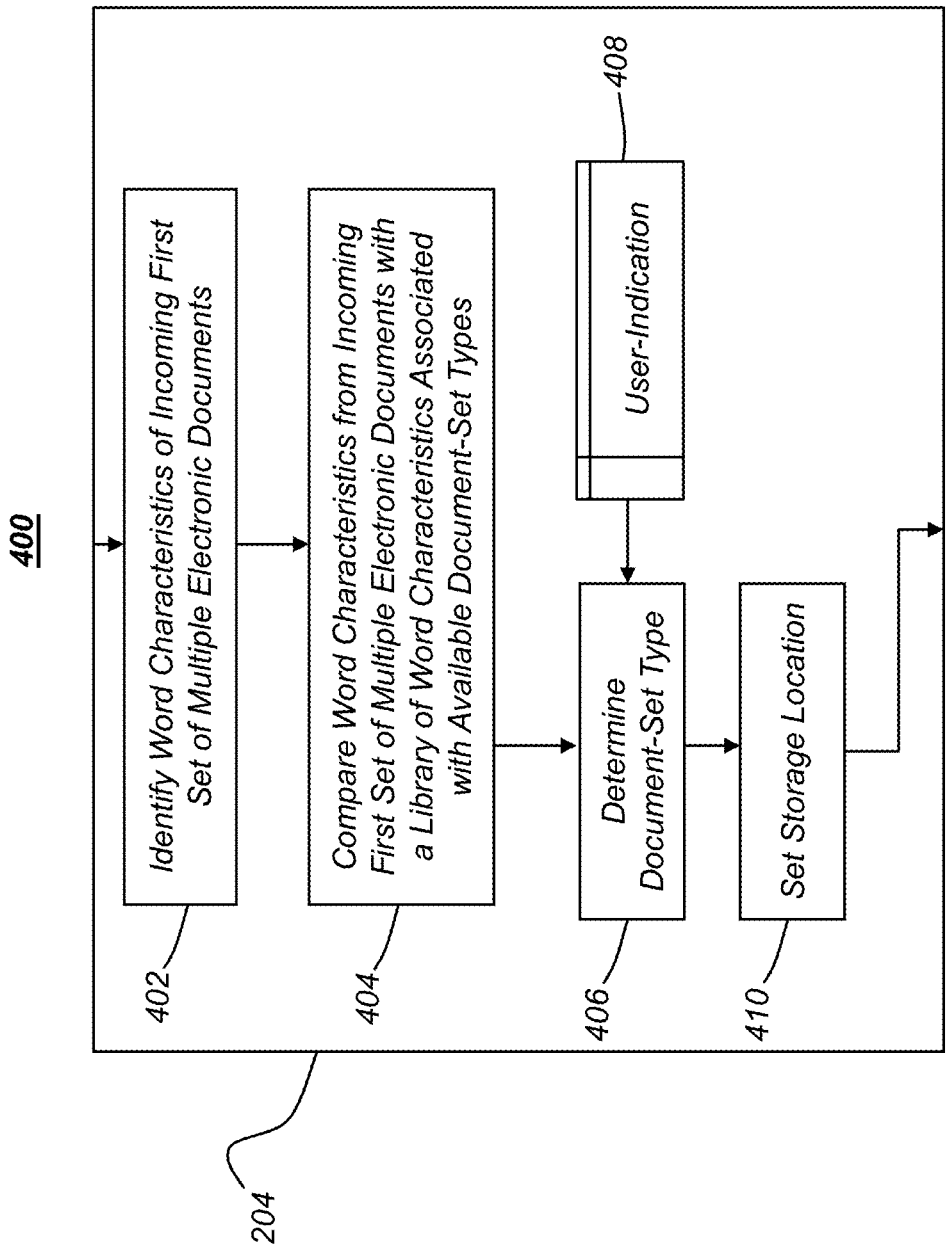
FIG. 4 illustrates particular implementations of a second portion of the method of FIG. 2, according to some embodiments of the present invention.

Turning now to FIG. 4, a method 400 is illustrated, which provides example implementations of the processing associated with block 204 in FIG. 2, according to some embodiments. The method 400 may be associated with determining a document-set type of an incoming unknown set of multiple electronic documents, such as a set of multiple electronic documents 702. Such a set of multiple electronic documents 702, which is accessed and analyzed, at least in part, in order to determine the document-set type associated with such set of multiple electronic documents 702, is sometimes referred to herein as a "first" set of multiple electronic documents 702, as indicated in at least block 402 in FIG. 4. In this regard, the use of the label "first" is merely for differentiation purposes and not necessarily to indicate a specific ordering between sets of multiple electronic documents.

As indicated by block 402, the method 400 may include identifying word characteristics of at least one electronic document in the incoming first set of multiple electronic documents 702. The word characteristics may be generated by performing OCR or other text-recognition processes known in the art on one or more electronic documents in the first set of multiple electronic documents 702. With respect to the simplified example shown in FIG. 10, the processing associated with block 402 may include performing OCR on the first electronic document 706 (FIG. 7) to generate the ordered text information 710 (FIG. 7), an example of which is shown in a simplified manner in FIG. 10 as ordered text information 1002.

As indicated by block 404, the method 400 may include comparing the word characteristics (e.g., the ordered text information 1002) associated with at least one electronic document (e.g., the first electronic document 706) in the incoming first set of multiple electronic documents 702 with a library of word characteristics (e.g., such a library may be the collection of word characteristics 606, 608 in the simplified example of FIG. 6) associated with the available document-set types (e.g., the document-set types 602, 604 in the simplified example of FIG. 6).

Figure 10:
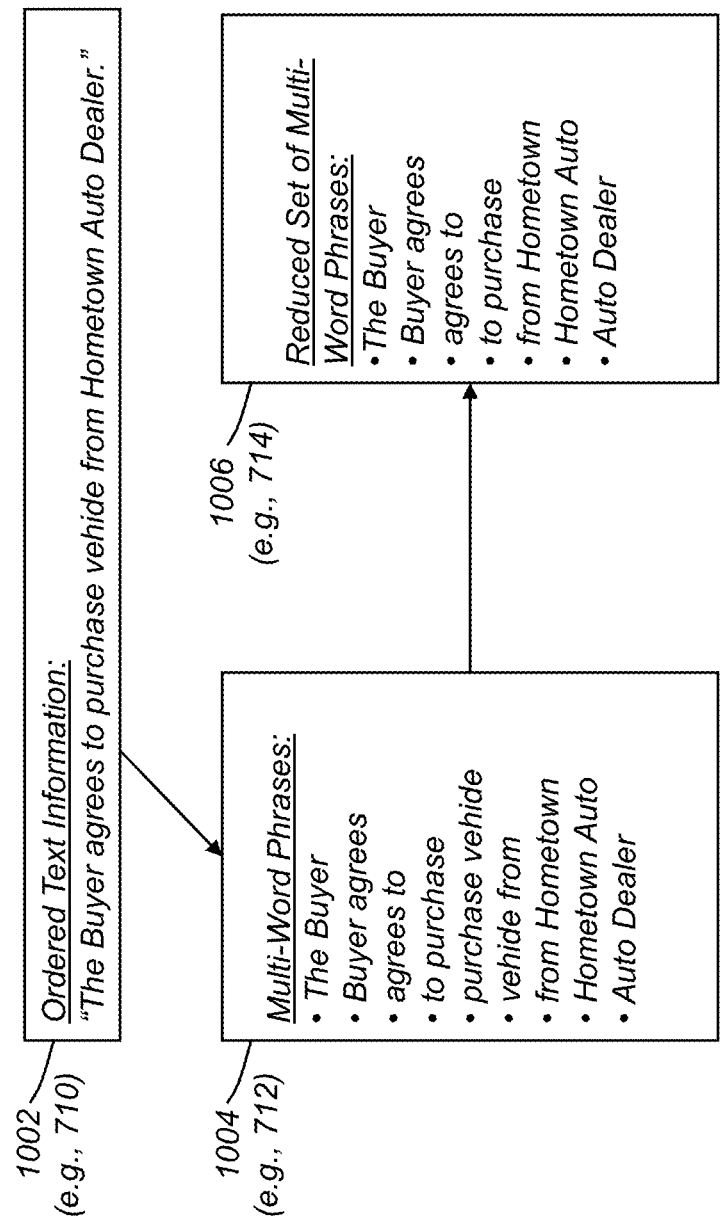
FIG. 10 illustrates text information and multi-word-phrase information in a computer-readable document that is processed to determine a document type of the computer-readable document, according to some embodiments of the present invention.

For example, the processing associated with block 402 may include a comparison of the ordered text information 1002 with the word characteristics (e.g., word characteristics 606, 608 in FIG. 6) associated with each document-set type (e.g., document-set type 602, 604 and FIG. 6). For instance, if the word characteristics 606 included the entity name "Hometown Auto Dealer", the processing associated with block 402 may include searching the ordered text information 1002 for such entity name. In the example of FIG. 10, since the ordered text information 1002 does include such entity name, a match with the first document-set type 602 may be registered.

As indicated by block 406, the method 400 includes determining a particular document-set type of the (e.g., new) set of multiple electronic documents based at least on results of the comparison performed according to the processing associated with block 404, according to some embodiments. In other words, block 406 may be associated with program instructions configured to cause the data processing device system 110 to determine a particular document-set type associated with a new set of multiple electronic documents, such as the first set of multiple electronic documents 702, according to some embodiments. For example, if a comparison associated with block 404 results in the registration of a match with the first document-set type 602, such first document-set type 602 may be determined to be associated with the first set of multiple electronic documents 702, according to the processing associated with block 406. According to some embodiments, user confirmation of such determination may be sought via the input-output device system 120. The user-indication 408, received via the input-output device system 120, may represent such user confirmation, according to some embodiments. In this regard, the determination associated with block 406 may be based at least on the user-indication 408 received via the input-output device system 120.

Having linked the first set of multiple electronic documents with a particular document-set type pursuant to the processing associated with block 406, the data processing device system 110 may now utilize the definition of the set of document types associated with the particular document-set type to determine document types of individual electronic documents within the set of multiple electronic documents. For example, having linked the first set of multiple electronic documents 702 with the first document-set type 602, the data processing device system 110 may now select the first document-set type 602 for its analysis of document types for the first set of multiple electronic documents 702 by utilizing the first definition 610 of the first set of document types associated with the first document-set type 602 to determine document types of individual electronic documents 706, 708 within the first set of multiple electronic documents 702. Such determination of document types of individual electronic documents, according to some embodiments, is described in more detail below with respect to FIG. 5.

In some embodiments, as illustrated by block 410, the method 400 may include setting a storage location or region (e.g., folder or group of folders) for the set of multiple electronic documents based at least upon the determination of the document-set type according to the processing associated with block 406. For example, it is determined according to the processing associated with block 406 that the first set of multiple electronic documents 702 is associated with the entity "Hometown Auto Dealer", the data processing device system 110 may be configured to set as a storage location in the processor-accessible memory device system 130 a secure storage location reserved for such entity. Such setting of different storage locations associated with different document-set types may be beneficial at least in some contexts where sets of multiple electronic documents are being processed for different entities or industries and confidentiality and security of information associated with such different entities is preferable.

Figure 5:
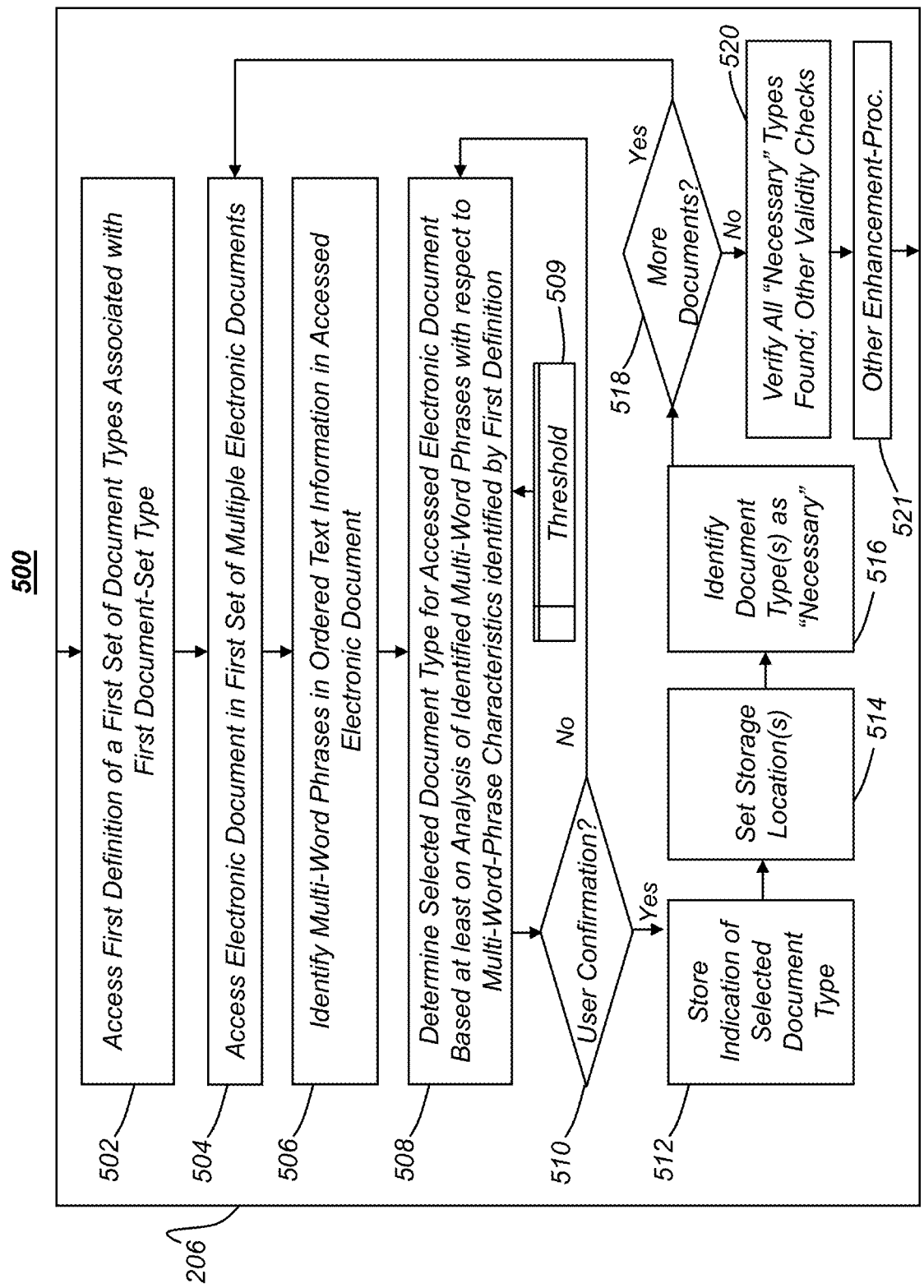
FIG. 5 illustrates particular implementations of a third portion of the method of FIG. 2, according to some embodiments of the present invention.

Turning now to FIG. 5, a method 500 is illustrated, which provides example implementations of the processing associated with block 206 in FIG. 2, according to some embodiments. The method 500 may be associated with determining document types of individual electronic documents within a set of multiple electronic documents.

As indicated by block 502, the method 500 may include accessing a first definition (e.g., the first definition 610) of the first set of document types associated with a first document-set type (e.g., the first document-set type 602 determined to be associated with the first set of multiple electronic documents 702 according to the processing associated with block 406 in FIG. 4). Such accessing may be a retrieval via the processor-accessible memory device system 130.

As indicated by block 504, the method 500 may include accessing a first electronic document (e.g., first electronic document 706) in the first set of multiple electronic documents (e.g., first set of multiple electronic documents 702 associated with the first document-set type 602 according to the processing associated with block 406) for which document types are to be determined. As before, such accessing may be a retrieval via the processor-accessible memory device system 130.

As indicated by block 506, the method 500 may include identifying multi-word phrases in ordered text information in the accessed electronic document. For example, in some embodiments, the identification associated with block 506 may include the data processing device system 110 accessing or retrieving via the processor-accessible memory device system 130 the reduced set of multi-word phrases 714 associated with the first electronic document 706. Recall that, according to some embodiments, the reduced set of multi-word phrases 714 were derived from the ordered text information 710 associated with the first electronic document 706.

With respect to the simplified example of FIG. 10, the multi-word phrases 1004 may be generated from the ordered text information 1002 (which is a simplified example of the ordered text information 710) as described above with respect to the examples of FIG. 8 and FIG. 9, with the multi-word phrases 1004 representing a simplified example of the multi-word phrases 712 associated with the first electronic document 706. Similar to the examples of FIG. 8 and FIG. 9, the reduced set of multi-word phrases 1006 (which is a simplified example of the reduced set of multi-word phrases 714) is generated by removing multi-word phrases from the multi-word phrases 1004 that include a word not in a predetermined dictionary (e.g., a predetermined English language dictionary in this example). However, in some embodiments, in contrast to the examples of FIG. 8 and FIG. 9, the reduced set of multi-word phrases 1006 is not generated based on any comparison between multi-word phrases in the multi-word phrases 1004 and multi-word phrases and any other electronic document. In other words, in some embodiments, the process of identifying the reduced set of multi-word phrases associated with block 506 utilizes rule (a), but not rule (b) discussed above with respect to block 306. Recall that rule (a) removed any multi-word phrase including a word not present in a predetermined dictionary, and rule (b) removed any multi-word phrase present in the multi-word phrases of any other electronic document in the same set of multiple electronic documents being analyzed. One potential benefit of this distinction is that rule (b) may be suitable for generating relatively unique multi-word-phrase characteristics (e.g., 616, 618) in a definition (e.g., first definition 610), but may have less applicability when attempting to match an unknown document with a defined document type by utilizing the multi-word-phrase characteristics.

Applying rule (a) to the certified example of FIG. 10, the phrases "purchase vehide" and "vehide from" are removed from the multi-word phrases 1004 to generate the reduced set a multi-word phrases 1006, because the word "vehide" is a misspelling or an OCR error of the word "vehicle" and, therefore, is not present in the predetermined English-language dictionary.

As indicated by block 508, the method 500 may include determining a selected document type for the accessed electronic document based at least on an analysis of the multi-word phrases identified according to the processing associated with block 506 with respect to multi-word-phrase characteristics identified by the first definition accessed according to the instructions associated with block 502. For example, the processing associated with block 508 may include a comparison of the reduced set of multi-word phrases 714 associated with the first electronic document 706 with the multi-word-phrase characteristics 616, 618 respectively associated with each document type 612, 614 identified by the first definition 610.

For example, according to the processing associated with block 508, the reduced set of multi-word phrases 1006 (an example of the reduced set of multi-word phrases 714) in FIG. 10 may be compared with the reduced set of multi-word phrases 806 (an example of multi-word-phrase characteristics 616, which may include or be the distinct multi-word phrases discussed above) in FIG. 8 and the reduced set of multi-word phrases 906 (an example of multi-word-phrase characteristics 618) in FIG. 9. In this regard, the comparison of the reduced set of multi-word phrases 1006 with the reduced set of multi-word phrases 806 results in about an 86% match (six out of the seven multi-word phrases in the reduced set of multi-word phrases 1006 are present in the reduced set of multi-word phrases 806). On the other hand, the comparison of the reduced set of multi-word phrases 1006 with the reduced set of multi-word phrases 906 results in a 0% match (none of the seven multi-word phrases in the reduced set of multi-word phrases 1006 are present in the reduced set of multi-word phrases 906). Although this simplified example provides a stark contrast in match percentages, such a stark contrast may not exist for electronic documents which include much more text than that shown by the ordered text information 802, 902, and 1002, which may result in much larger sets of multi-word phrases 806, 906, 1006.

In some embodiments, the analysis associated with block 508 may include determining whether the identified multi-word phrases (e.g., the reduced set of multi-word phrases 1006) have a similarity with the set of defined multi-word phrases (e.g., the reduced set of multi-word phrases 806, 906, respectively) meeting a threshold. For example, the analysis associated with block 508 may include a comparison of the respective above-discussed match percentages with a threshold 509. For example, a minimum of at least a 70% match may be required for a particular document type to be considered as a potential match. Of course, other threshold amounts besides 70% may be implemented, and, in some embodiments, the threshold may be adjusted manually, automatically, or both, as discussed in more detail below. Also, other types of thresholds, besides a percentage match, may be implemented according to some embodiments. In some embodiments, the threshold (e.g., threshold 509) may be determined by the data processing device system 110 based on a number of multi-word phrases (e.g., an average number of multi-word phrases) in the set or sets of defined multi-word phrases (e.g., the reduced sets of multi-word phrases 806, 906). For example, if the reduced sets of multi-word phrases 806, 906 respectively had a large number of phrases, a lower threshold percentage may be set for threshold 509, as compared to such sets 806, 906 having a fewer number of phrases respectively. If no match meets the threshold 509, the user may be notified via the input-output device system 120 that no match has been found for this particular electronic document.

In some embodiments, the processing associated with block 508 may determine the document type associated with the highest match percentage to be the selected document type for the accessed electronic document. Continuing with the preceding example, the processing associated with block 508 may determine document type A 612 to be the selected document type for the accessed first electronic document 706 because the comparison between the reduced set of multi-word phrases 1006 and the reduced set of multi-word phrases 806 achieved the greatest match percentage (86% compared to 0%).

Alternatively or in addition to the text-based comparisons performed according to block 508, (e.g., if no match meets the threshold 509), the data processing device system 110 may be configured by program instructions associated with block 508 to perform image processing or image analysis on the particular electronic document in an attempt to determine a match or potential match, according to various embodiments. For example, the data processing device system 110 may be configured to perform an overlay or comparison of an image of the particular document with each image of each document in the second set of documents (e.g., referred to at blocks 301 and 302) analyzed to generate (e.g., according to processes associated with the method 300 of FIG. 3) the first definition (e.g., referred to at block 508). In this regard, the threshold 509 may be adjusted to or alternatively represent a percentage image similarity match needed to determine or improve a confidence level in a determined selected document type according to block 508. Accordingly, in some embodiments, the data processing device system 110 is configured by program instructions associated with block 508 at least to, for each of at least one electronic document accessed according to block 504 in the first set of multiple electronic documents, and in a state in which it is determined according to block 508 that the threshold 509 is not met for the accessed electronic document: determine, for the accessed electronic document, the selected document type based at least on an image-comparison-analysis between a first image of the accessed electronic document and images of electronic documents from which the first definition is generated.

For instance, in some embodiments, the threshold 509 may include two thresholds: a first, text-based similarity threshold being, e.g., the multi-word-phrase minimum matching percentage discussed above that attempts to determine a document type based on multi-word-phrase comparison, and a second, image-based similarity threshold being, e.g., an image similarity comparison threshold that may be employed if the first, text-based similarity threshold is not met. Of course, although this example discusses utilizing the second, image-based similarity threshold in the case where the first, text-based similarity threshold is not met, some embodiments may employ the second, image-based similarity threshold at least in some instances where the first, text-based similarity threshold is met, in an attempt to improve a confidence level in the document type determined according to the program instructions associated with block 508. In some embodiments, the image-based similarity threshold is employed at least in some instances as the primary document type similarity determination, with the text-based similarity determination employed as a secondary similarity determination in a state in which the image-based similarity threshold is not met or in a state in which the image-based similarity threshold is met, but improved confidence in the document type determination is desirable. However, there may be contexts in which performing the text-based similarity determination as at least the primary document type similarity determination is preferable, e.g., since text-based processing may be quicker and more processing-efficient than image-based similarity determinations. Nonetheless, in some contexts, such as for particular documents or document types that lack a sufficient amount of text, it may be preferable to employ the image-based similarity determination as the primary or even the sole similarity determination per block 508, according to some embodiments.

Figure 11:
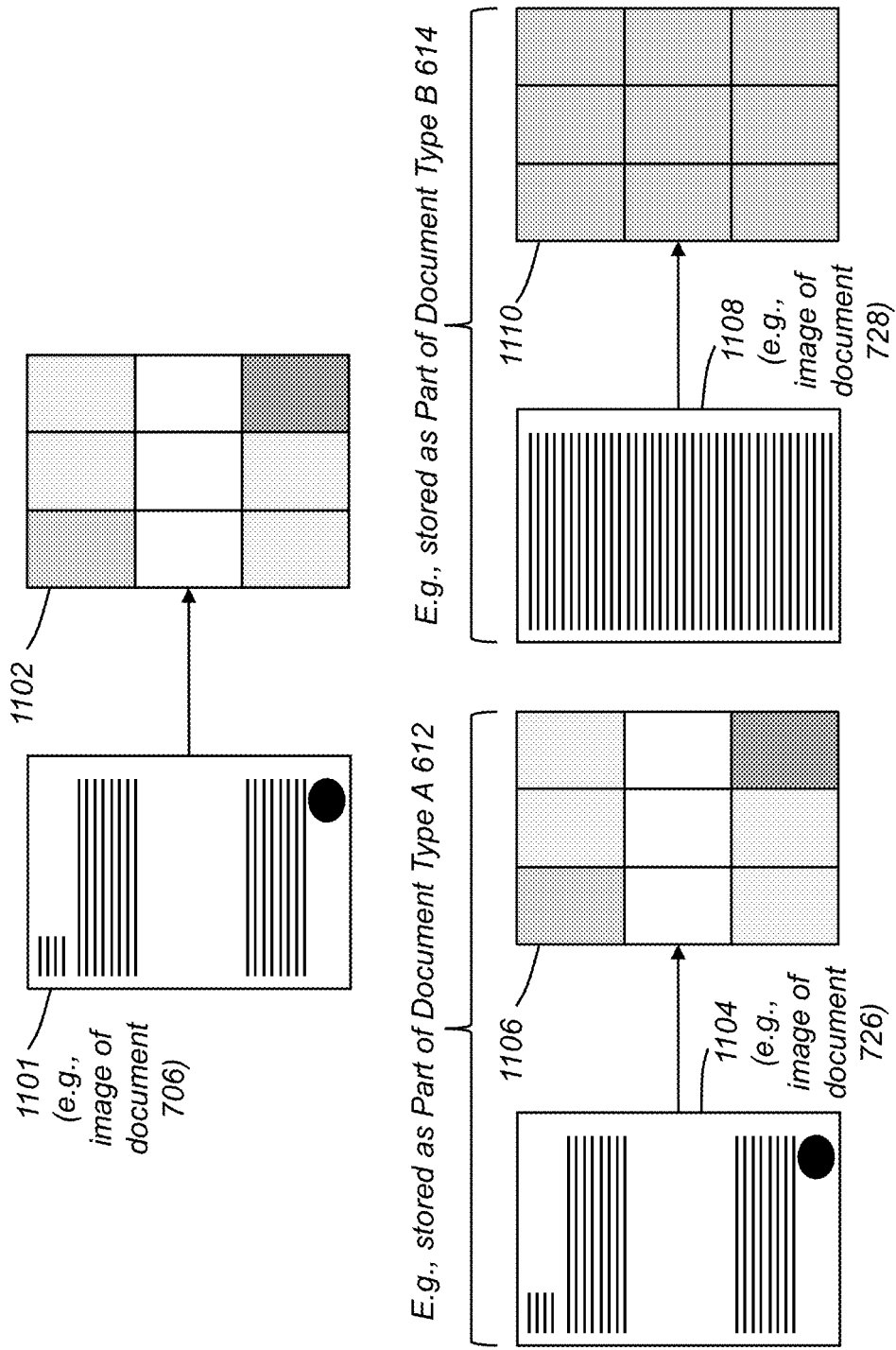
FIG. 11 illustrates a mega-pixel image generation and comparison process, according to some embodiments of the present invention.

Examples will now be provided of such an image-based similarity determination with respect to FIG. 11, according to some embodiments of the present invention. FIG. 11 continues with the previous example where the first electronic document 706 is being compared at block 508 to each of the document types 612, 614 identified by the first definition 610 in order to determine a selected document type for the first electronic document 706. In this regard, in some embodiments, the program instructions associated with block 508 may include comparing a mega-pixel image generated by extensively blurring an image 1101 of the first electronic document 706 to each corresponding mega-pixel image 1106, 1110 generated by extensively blurring each respective image 1104, 1108 of the respective document utilized to generate each document type 612, 614. For instance, with respect to FIG. 11, the program instructions associated with block 508 may include causing the data processing device system 110 to perform extensive blurring image processing on the image 1101 of the first electronic document 706 to produce a mega-pixel image 1102, according to some embodiments (although other embodiments provide for such image processing to be performed at another point in the workflow). In the example of FIG. 11, the image 1101 of the first electronic document 706 is blurred to such an extent that the mega-pixel image 1102 includes only nine pixels, where each pixel in the mega-pixel image 1102 represents an averaging of pixel values of the pixels in the corresponding ⅑ (one-ninth) of the image of the first electronic document 706. However, the mega-pixel image 1102 need not only have nine pixels, and may instead have a different resolution. In this regard, in some contexts, it may be preferable that that mega-pixel image (e.g., mega-pixel image 1102) represent a reduction in pixel values from the original image (e.g., of the first electronic document 706) of at least 80% (e.g., reducing a 300 dpi (dot-per-inch) original image to a 60 dpi mega-pixel image)

in some embodiments, and at least 90% (e.g., reducing a 300 dpi original image to a 30 dpi mega-pixel image) in some embodiments. Such extensive blurring to generate a mega-pixel image may be beneficial at least in some contexts where fast image-comparison processing is desired, since the mega-pixel image (e.g., mega-pixel image 1102) will be compared to the mega-pixel images (e.g., mega-pixel image 1106 and mega-pixel image 1110 in FIG. 11) associated with each of the possible document types (e.g., document type A 612 and document type B 614 in the example of FIG. 11). Fewer pixels in the respective mega-pixel images to be compared results in faster image comparison processing, potentially, however, at the expense of comparison accuracy. Accordingly, in some contexts where comparison accuracy is of greater value than comparison speed, the mega-pixel images may have relatively greater pixel resolution, according to various embodiments. In this regard, pixel resolution reductions of at least 50% may be suitable in some embodiments and pixel resolution reductions of at least 99.5% may be suitable in other embodiments. However, pixel resolution reductions of about 70% to 90% may be particularly suitable in various embodiments as a good balance between processing speed and accuracy. Of course, pixel resolution reduction is a function of resolution of the original image. In this regard, in some embodiments, the generated mega-pixel images may preferably have a display resolution of less than or equal to about 200×200 pixels in some embodiments, less than or equal to about, e.g., 100×100 pixels in some embodiments, less than or equal to about 64×64 pixels in some embodiments, or less than or equal to about 32×32 pixels in some embodiments. However, selecting a predetermined mega-pixel display resolution in the range of about 128×128 pixels to 32×32 pixels may be particularly suitable in various embodiments as a good balance between processing speed and accuracy.

Continuing with the preceding example discussed above, the data processing device system 110 may be configured by program instructions associated with block 508 to compare the mega-pixel image 1102 to the mega-pixel image 1106 associated with document type A 612 and then to the mega-pixel image 1110 associated with document type B 614 in order to determine which has the greatest similarity with the mega-pixel image 1102. The mega-pixel images respectively associated with the document types (e.g., mega-pixel image 1106 and mega-pixel image 1110 in the example of FIG. 11) may be generated in the method 300 of FIG. 3 (e.g., as part of the preprocessing preparation block 301, updating the definition block 312, checking/removal of duplicate/near-duplicate documents block 313, some other portion of method 300, or a combination thereof) and may be stored in association with the respective portion of the respective definition. For example, the mega-pixel image 1106 may be generated by extensively blurring the image 1104 of the electronic document 726, and the image 1104 and the mega-pixel image 1106 may be stored within the document type A 612 data structure. Similarly, the mega-pixel image 1110 may be generated by extensively blurring the image 1108 of the electronic document 728, and the image 1108 and the mega-pixel image 1110 may be stored within the document type B 614 data structure. Also similarly, the image 1101 and the corresponding mega-pixel image 1102 may be stored within the first electronic document 706 data structure.

In some embodiments, the comparison of mega-pixel images (e.g., the comparison of mega-pixel image 1102 with mega-pixel image 1106 and the comparison of mega-pixel image 1102 with mega-pixel image 1110) may include summing the absolute value of differences in pixel values between each corresponding pixel of the two mega-pixel images. In this regard, the threshold 509 may represent a maximum value of the summed differences in pixel values. For example, assume that mega-pixel image 1102 includes the following set of pixel values, from upper-left pixel to lower-right pixel, proceeding from left to right across rows first, then columns, where a pixel value of 255 represents pure white and a pixel value of zero represents pure black: (210, 220, 223, 255, 255, 255, 223, 220, 140). Also assume that mega-pixel image 1106 includes the following corresponding set of pixel values: (211, 220, 225, 253, 254, 255, 220, 226, 150). In this example, the sum "S1" of all absolute-value-differences is: abs(210−211)+abs(220−220)+abs(223−225)+abs(255−253)+abs(255−254)+abs(255−255)+abs(223−220)+abs(220−226)+abs(140−150), which equals: (1+0+2+2+1+0+3+6+10), which equals 25. That is, S1=25 in this example.

Continuing with this example, assume the sum "S2" of all absolute-value-differences between the pixel values of the mega-pixel image 1102 and the mega-pixel image 1110 is 120. That is, S2=120 in this example. Also assume that the image-comparison threshold 509 in this example is T<=(less than or equal to) 100. With the comparison values (e.g., S1, S2 in this example), and the threshold (T in this example) known, the data processing device system 110 may be configured by the program instructions associated with block 508 to include as possibilities all document types that resulted in a mega-pixel-image comparison that met the threshold T. In this example, since only S1 met the threshold T by being less than or equal to 100, document type A 612 may be determined as the selected document type for the first electronic document 706. In instances where more than one mega-pixel-image comparison meets the threshold T, the associated multiple corresponding document types may be presented to a user for selection of the document type (e.g., per block 510, discussed below). On the other hand, even when only a single document type resulted in a mega-pixel-image comparison that met the threshold T, user-confirmation may be sought (e.g., per block 510, discussed below). In some embodiments, threshold 509 need not be implemented at least for the image-comparison, such that the comparisons resulting in the best match, or the best matches, are presented to the user (e.g., per block 510, discussed below) for selection.

In view of the above, it can be seen that, in some embodiments, the data processing device system 110 may be configured by the program instructions (e.g., associated with block 508 or some other portion of method 500) at least to generate a first mega-pixel image (e.g., mega-pixel image 1102) from a first image (e.g., image 1101) of an accessed electronic document (e.g., accessed according to block 504, such as electronic document 706), where the first mega-pixel image represents a first reduction in pixel resolution from the first image of the accessed electronic document. In some embodiments, the data processing device system 110 may be configured by the program instructions (e.g., associated with block 508 or some other portion of method 500) at least to generate a second mega-pixel image (e.g., mega-pixel image 1106) from a second image (e.g., image 1104) of a second electronic document (e.g., electronic document 726) from which the applicable definition (e.g., first definition 610) is generated. The second mega-pixel image may represent a second reduction in pixel resolution from the second image of the second electronic document from which the first definition is generated. In some embodiments, a first resolution of the first mega-pixel image is equal to a second resolution of the second mega-pixel image, which can be important to allow for a comparison of respective pixel values between both mega-pixel images. In some embodiments, e.g., in instances where the original images, which are, e.g., blurred to form the first and second mega-pixel images, have different original pixel resolutions, the pixel reductions applied to the original images are different in order to achieve resulting mega-pixel images that have equal pixel resolutions. For instance, if a first original image has a display resolution of 200×200 pixels in this simplified example, and a second original image has a display resolution of 100×100 pixels in this simplified example, a pixel reduction of 75% may be applied to the first original image to achieve a first mega-pixel image with a display resolution of 50×50 pixels, and a pixel reduction of 50% may be applied to the second original image to achieve a second mega-pixel image with the same 50×50 pixel display resolution, according to some embodiments. In some embodiments, the image-comparison-analysis (which may be performed at least according to block 508) between the first image (e.g., image 1101) of the accessed electronic document (e.g., electronic document 706) and images (e.g., images 1104, 1108) of electronic documents (e.g., electronic documents 1104, 1108) from which the first definition is generated includes comparing pixel values of the first mega-pixel image (e.g., mega-pixel image 1102) and the second mega-pixel image (e.g., mega-pixel image 1106). While the above example utilizes a sum-of-absolute-value-differences in corresponding pixel values in a mega-pixel-image comparison, other pixel value comparisons may be implemented. In some embodiments, a root mean square (RMS) of the differences may be performed, e.g., by squaring each difference in corresponding pixel values, averaging such values, and then determining the square root of that average. This approach would more heavily weight mega-pixels with significant differences.

While the above examples of image comparison pertain to determining a selected document type per block 508, such image comparisons may additionally or alternatively be included as part of block 313 when searching for identical or near-identical documents to remove from the set of multiple electronic documents (referred to at least at block 301), according to some embodiments. By performing image comparison in addition to text-based comparisons to check for duplicate or near-duplicate documents for removal, increased confidence in the corresponding determinations may be provided.

According to some embodiments and in some contexts, the above discussed image-based analyses/comparisons effectively supplement and improve confidence levels of the multi-word phrase-based analyses/comparisons by providing time and processing efficient image-based analyses to improve confidence levels in document types determined according to, e.g., block 508. In this regard, since the multi-word phrase-based analyses can provide a high quality document-type match, processing-intensive image-based analyses may be unnecessary in order to increase confidence in a determined document type to a sufficient level, according to some contexts and embodiments. On the other hand, in some embodiments, the highly efficient image-based analyses described above may be particularly beneficial for use in lieu of a text-based analysis in some contexts, e.g., when different document types vary greatly in appearance or have limited amounts of text.

As indicated by the decision diamond 510, the method 500 may include seeking user confirmation of the document type or types selected according to the program instructions associated with block 508. For example, the data processing device system 110 may be configured by program instructions associated with decision diamond 510 to visually present to a user, via a display device included in the input-output device system 120, an indication that the accessed first electronic document 706 has been determined to be of document type A 612. In some embodiments, the data processing device system 110 is configured by program instructions associated with decision diamond 510 to cause display, via the input-output device system 120, of at least an image of the accessed electronic document along with the respective indication of the selected document type (e.g., document type A 612) for the accessed electronic document, e.g., for user-confirmation purposes. In this regard, the data processing device system 110 may be configured by program instructions associated with decision diamond 510 to seek confirmation from the user that the user agrees that the accessed first electronic document 706 is of document type A 612. The response received from the user for such confirmation may be considered user-input received by the data processing device system 110 via the input-output device system 120 indicating that the selected document type for the accessed electronic document is correct or incorrect.

In some embodiments, if the user does not confirm a document type initially selected according to the processing associated with block 508, processing may proceed from decision diamond 510 back to block 508, where another document type may be selected. For example, upon return to block 508, a next-highest-match-percentage document type may be determined as the next selected document type, according to some embodiments. If no next-highest-match-percentage document types exist that meet the threshold(s) 509, the threshold(s) 509 may be automatically adjusted by the data processing device system 110 or manually adjusted by the user via interaction with the data input-output device system 120, to bring in at least one more document type that would meet the adjusted threshold(s) 509, according to some embodiments. In this regard, in some embodiments, the threshold(s) 509 may be changed if a user indicates that the document type previously selected according to the processing of block 508 was incorrect (e.g., via an indication of "no" according to the decision diamond 510).

After selecting another document type via the return to block 508, processing may then proceed again to decision diamond 510 for user confirmation. If user confirmation cannot be obtained at decision diamond 510, the block 508/decision diamond 510 loop may be repeated until such user confirmation is obtained or no more document types are available for selection upon return to block 508. If no more document types are available for selection upon return to block 508, manual intervention from the user may be sought to determine the document type to be selected for the accessed electronic document.

If user confirmation is obtained at decision diamond 510, the data processing device system 110 may be configured by program instructions associated with block 512 of the method 500 to cause the processor-accessible memory device system 130 to store an indication of the selected document type for the accessed electronic document, according to some embodiments. The stored indication may be data linking the accessed electronic document with the selected document type that is confirmed at decision diamond 510. Continuing with the above example, such an indication is stored as the selected document type 716 as metadata associated with the access first electronic document 706, according to some embodiments. In this regard, the selected document type 716 may be considered an example of an indication linking the first electronic document 706 to a document type (e.g., document type A 612) in the first set of document types defined by the first definition 610. In some embodiments, in a case where no sufficient match with any document type in the applicable definition (e.g., first definition 610 or other definition) is determined according to the processing associated with block 508, the selected document type data field (e.g., selected document type 716 or other selected document type data field) may be populated with a value that indicates something akin to "undefined", "unknown", "null" or "do not care" to reflect that the respective electronic document has not been associated with any particular document type in the applicable definition.

As indicated by block 514, the method 500 may include determining a storage location or region for one or more electronic documents (e.g., in the first set of multiple electronic documents 702) based at least on the determination of the selected document type associated with the present accessed electronic document and, consequently, causing the processor-accessible memory device system 130 to store at least one electronic document (e.g., in the first set of multiple electronic document 702) at the determined storage location. For example, in the automobile transaction context, if the selected document type (e.g., selected according to the processing associated with block 508, confirmed according to decision diamond 510, and stored according to the processing associated with block 512) indicates an automobile lease transaction, it may be desirable to store the associated electronic document by the processor-accessible memory device system 130 within a particular storage "folder" or "folders" identified for an automobile lease transaction along with one or more other electronic documents "needed" to complete leasing aspects of such transaction. On the other hand, for example, if the selected document type indicates an automobile purchase transaction, it may be desirable to store the associated electronic document by the processor-accessible memory device system 130 within a particular storage "folder" or "folders" identified for an automobile purchase transaction along with one or more other electronic documents "needed" to complete leasing aspects of such transaction. Accordingly, as at least part of the processing associated with block 514, the data processing device system 110 may access a database or other data storage mechanism stored by the processor-accessible memory device system 130 that provides rules for determining where electronic documents of various selected document types should be stored by the processor-accessible memory device system 130. In addition to or in lieu of storage location identification, file naming protocols may be adopted, such as by adding a phrase associated with the selected document to the name of the corresponding electronic document, e.g., by appending "lease", "finance", or "cash deal" to a file name of the corresponding electronic document, depending on the corresponding selected document type. The deal type or other document metadata could also be identified by the data processing device system 110 for storage by the processor-accessible memory device system 130.

As indicated by block 516, the method 500 may include identifying one or more document types as "necessary", e.g., via one or more of the data fields 617, 619, 627, 629, based at least on the selected document type associated with the accessed electronic document. For example, in the automobile transaction context, if the selected document type indicates that the accessed electronic document is an automobile lease agreement, it may be known that it is necessary to have a credit history request authorization form in the same deal jacket. Accordingly, for example, if document type A 612 is an automobile lease agreement, and if document type B 614 is a credit history request authorization form, the "necessary" flag data field 619 associated with document type B 614 may be set to 'yes' in a case where an accessed electronic document is determined to be associated with document type A 612 (e.g., via blocks 508, 510, 512), according to some embodiments. With such "necessary" flag data field 619 set to 'yes', the data processing device system 110 is configured, for example, to ensure (e.g., via block 520 of method 500 discussed in more detail below) that the first set of multiple electronic documents 702 includes document type B 614 to help ensure that the deal jacket is complete. Accordingly, as at least part of the processing associated with block 516, the data processing device system 110 may access a database or other data storage mechanism stored by the processor-accessible memory device system 130 that provides rules for determining which document data types are "necessary" in a case where a selected document type is associated with an accessed electronic document (e.g., via blocks 508, 510, 512).

At decision diamond 518 of method 500, the data processing device system 110 may be configured to determine whether any more electronic documents of the first set of multiple electronic documents (e.g., the first set of multiple electronic documents 702) have yet to be processed according to at least parts of the method 500, according to some embodiments. If at least one electronic document remains to be processed (e.g., second electronic document 708 from the above example initially processing first electronic document 706), processing may proceed from the decision diamond 518 back to block 504, where such a remaining electronic document (e.g., second electronic document 708) in the first set of multiple electronic documents is accessed and then processed by subsequent blocks 506, 508, etc. pursuant to the discussions above. If all electronic documents in the first set of multiple electronic documents have been processed at decision diamond 518, processing may proceed to block 520.

As indicated by block 520, the method 500 may include confirming or verifying that all "necessary" document types have been found. For example, according to program instructions associated with block 520, the data processing device system 110 may be configured to check whether any document type in the first definition (e.g., in the first definition of the first set of document types 610) that has an affirmative "necessary" flag data field or indication (e.g., "necessary" flag data fields 617, 619) has no match in the set of selected document data types associated with the electronic documents in the first set of multiple electronic documents (e.g., via blocks 508, 510, 512). If any "necessary" document type meets this criteria (e.g., has not been one of the selected document data types), the program instructions associated with block 520 may configure the data processing device system 110 to cause the processor-accessible memory device system 130 to store a failure indication (e.g., inform the user via the input-output device system 120) indicating that such document type has not been found in the first set of multiple electronic documents. For example, in the automobile transaction context, if an electronic document in the first set of multiple electronic documents is determined to be an automobile lease agreement, but the data processing device system 110, in the execution of the method 500, has not found any other electronic document in the first set of multiple electronic documents to be a "necessary" credit history request authorization form, the user may be notified, e.g., that, for an automobile lease transaction, a credit history request authorization form is required, but that such form has not been found in the first set of multiple electronic documents. In such a manner, the user may be informed that the first set of multiple electronic documents is not complete in order to take corrective action.

In some embodiments, program instructions associated with block 520 may additionally include or alternatively include one or more verification procedures for the first set of multiple electronic documents (e.g., the first set of multiple electronic documents 702), or at least one or more documents therein, other than or in addition to checking for all "necessary" documents. For example, in some embodiments, depending on (a) the document-set type determined according to block 406 in FIG. 4 for the first set of multiple electronic documents (e.g., the first set of multiple electronic documents 702), (b) the selected document type for a particular accessed electronic document according to at least block 508 in FIG. 5, or both (a) and (b), a corresponding set of tailored verification rules may be executed to ensure that one or more of the first set of multiple electronic documents (e.g., the first set of multiple electronic documents 702) is valid. For instance, if a particular document accessed according to the program instructions associated with block 502 is determined to be an automobile lease agreement form (e.g., as the selected document type determined per at least block 508) associated with Hometown Auto Dealer (e.g., as the first document-set type determined per at least block 406), verification rules tailored for this combination of document-set type and selected document type may be stored in the processor-accessible memory device system 130 and configured to cause the data processing device system 110 to, for instance, search for signatures at respective particular image locations tailored for an automobile lease agreement from Hometown Auto Dealer. If it is determined that such lease agreement is a present "necessary" document (e.g., per "Verify All "Necessary Types Found" per block 520) in the first set of multiple electronic documents (e.g., the first set of multiple electronic documents 702), but that one or more of the signatures is or are missing, an error notification may be stored in memory device system 130 or presented to a user informing of the missing signature(s).

In this regard, such an automobile lease agreement from Hometown Auto Dealer may require party signatures at different locations than, for example, an automobile lease agreement from a different automobile dealer. Accordingly, this configuration allows at least different verification rule sets to be associated with different combinations of document-set type (e.g., determined according to at least block 406) and individual document type (e.g., determined according to at least block 508). Accordingly, other document-set types and individual document types may have different rules, e.g., different signature requirements or locations on different individual document types, or other rules, according to various embodiments. For instance, in some embodiments, a particular verification rule set may include a requirement that at least one individual document type be manually reviewed for verification by a user for validity, which may be preferable for individual document types of high importance. In this regard, validity verification from the perspective of the data processing device system 110 may be receipt of an affirmative indication from the user via the data input-output device system 120 that the manual validity verification has successfully completed. For instance, in some embodiments, the particular verification rule set may include an instruction to cause the data processing device system 110 to visually present an electronic document of the one individual document type via a user interface of the input-output device system 120 for manual validation, and the data processing device system 110 may be configured to verify the validity of the visually presented electronic document at least in part by receiving an indication via the input-output device system 110 that the manual validation has completed successfully.

In view of the above-discussion, in some embodiments of the present invention, the data processing device system 110 may be configured by program instructions (e.g., associated with block 520 or otherwise) at least to utilize (a) the document-set type determined, e.g., according to at least block 406, (b) the selected document type determined, e.g., according to at least block 508, for at least one accessed electronic document accessed, e.g., according to at least block 502, to identify and access a corresponding verification rule set stored in the processor-accessible memory device system 130, the corresponding verification rule set corresponding to the one accessed electronic document; and verify a validity of the one accessed electronic document based at least on the identified and accessed corresponding verification rule set corresponding to the one accessed electronic document.

In some embodiments, method 500 may include one or more other enhancement processing procedures in addition to or instead of the validity checks performed according to the program instructions associated with block 520. These one or more other enhancement-processing procedures are represented by block 521 in FIG. 5. In some embodiments, one of such enhancement-processing procedures may include adding bookmarks (e.g., in cases where the first set of electronic documents 702 are PDF documents) to each document in the first set of electronic documents (e.g., the first set of electronic documents 702) based on each document's determined selected document type (e.g., determined per at least block 508). For instance, if the first set of electronic documents 702 are stored as a single PDF or other type of electronic document, and if the first set of electronic documents 702 are determined via processes associated with FIG. 5 to include an automobile lease form and a credit history request form, the data processing device system 120 may be configured by program instructions associated with block 521 to insert electronic bookmarks into the single PDF document or other type of electronic document identifying where (e.g., what pages of the single electronic document) the automobile lease form and the credit history request form begin. In this regard, in some embodiments, the data processing device system 110 may be configured by program instructions associated at least with block 521 at least to, in a state in which the first set of multiple electronic documents (e.g., the first set of multiple electronic documents 702) is stored as a single electronic document file, insert an electronic bookmark into the single electronic document file for each respective accessed electronic document of the documents accessed (e.g., according to block 504) in the first set of multiple electronic documents (e.g., the first set of multiple electronic documents 702), each inserted electronic bookmark indicating a beginning location of the respective accessed electronic document in the single electronic document file. Other embodiments may include other enhancement-processing procedures.

Returning to FIG. 4, although some embodiments determine document-set types (e.g., via processing associated with block 406) by implementing a matching of word characteristics from an incoming document set with word characteristics associated with pre-defined document-set types (e.g., word characteristics 606, 608 respectively associated with first document-set type 602 and second document-set type 604), some embodiments implement, in addition or instead, a version of the processing associated with FIG. 5 to identify a document-set type of an incoming set of electronic documents. For example, in some embodiments, the processing associated with blocks 502, 504, 506, and 508 (e.g., while omitting the processing associated with, e.g., blocks 510, 512, 514, 516, and 520) may be executed once for each document in the incoming set of electronic documents based on the first definition 610 of the first set of document types associated with the first document-set type 602. This processing may result, e.g., in a highest percentage match with a selected document type in the first set of document types for each electronic document in the incoming set of multiple electronic documents as discussed above, e.g., with respect to block 508 in FIG. 5. For example, assume document #1 in the incoming set of multiple electronic documents is determined to be best-matched with Document Type A 612 with an 80% phrase match, and document #2 in the incoming set of multiple electronic documents is determined to be best-matched with Document Type B 614 with an 70% phrase match.

Then, such processing associated with blocks 502, 504, 506, and 508 (e.g., while omitting the processing associated with, e.g., blocks 510, 512, 514, 516, and 520) may again be executed once for each document in the incoming set of electronic documents based on the second definition 620 of the second set of document types associated with the second document-set type 604. This second iteration of the processing may result, e.g., in a highest percentage match with a selected document type in the second set of document types for each electronic document in the incoming set of multiple electronic documents as discussed above, e.g., with respect to block 508 in FIG. 5. For example, assume document #1 in the incoming set of multiple electronic documents is determined to be best-matched with Document Type A 622 with an 70% phrase match, and document #2 in the incoming set of multiple electronic documents is determined to be best-matched with Document Type B 624 with an 65% phrase match.

Such processing associated with blocks 502, 504, 506, and 508 (e.g., while omitting the processing associated with, e.g., blocks 510, 512, 514, 516, and 520) may then be repeated for each other definition (only two shown as 602, 604 in FIG. 6, but additional definitions may exist) associated with each other document-set type.

Upon conclusion of such processing for each document-set type, a set of percentage matches associated with each document-set type is obtained. Continuing with the preceding example, Table I, below, shows the sets of percentage matches.

TABLE I

| Document-Set Type | Document # | Document Type | Match |
| --- | --- | --- | --- |
| First | 1 | A | 80% |
| First | 2 | B | 70% |
| Second | 1 | A | 70% |
| Second | 2 | B | 65% |

With such sets of percentage matches, the data processing device system 110 is configured to determine which document-set type provided the best matches. For example, the data processing device system 110 may be configured to calculate an average percentage match associated with each document-set type and chose the highest averaging document-set type as the document-set type determined at block 406 in FIG. 4. In the example of the above Table I, the data processing device system 110 may be configured to calculate the average match percentage associated with the first document-set type as (80%+70%)/2=75%, and to calculate the average match percentage associated with the second document-set type as (70%+65%)/2=67.5%. Since the first document-set type has the higher average match percentage, the data processing device system 110 may be configured to select it as the chosen document-set type according to the processing associated with block 406. Although this example utilizes a highest-average-match percentage example, the invention is not limited to such a particular implementation. For example, the best match across all document-set types for a particular document type, or any other statistical approach may be implemented, although the particular examples identified here may have particular benefits in certain contexts.

Subsets or combinations of various embodiments described above provide further embodiments.

For example, while some examples above discuss the execution of methods according to FIG. 4 to identify an entity name (such as "Hometown Auto Dealer") as a document-set type (e.g., document-set type 602) associated with an incoming first set of multiple electronic documents, in order to select a corresponding definition (e.g., first definition 610) to subsequently determine selected document types for individual electronic documents in the first set of multiple electronic according to methods of FIG. 5, other examples of course exist. For instance, methods according to FIGS. 4 and 5 may operate on one or more electronic documents, where methods according to FIG. 4 first identify a genus document type associated with the one or more electronic documents, and then methods according to FIG. 5 identify a species document type associated with the single electronic document. For example, assume that block 402 of FIG. 4 operates on an incoming first set of electronic documents including only a single document. Also assume that the first document-set type 602 in FIG. 6 is associated with a first genus document type, "automobile lease form" configured to identify an incoming single document as an automobile lease form, regardless of which entity the automobile lease form is associated, and the second document-set type 604 is associated with a second genus document type, "credit history request form" configured to identify in incoming single document as a credit history request form, regardless of which entity the credit history request form is associated. In this regard, for example, in a state in which the data processing device system 110 of FIG. 1 determines that the incoming set of multiple electronic documents is of the "automobile lease form" document type (e.g., first document-set type 602) according to instructions associated with block 406, the data processing device system 110 may be configured according to methods associated with FIG. 5 to thereafter determine a species document type for each electronic document in the incoming set, such as which entity (e.g., 'species') is associated with the automobile lease form (e.g., the 'genus' document type identified according to FIG. 4 in this example). In this regard, in the state in which the first document-set type 602 is an "automobile lease form", the document type A 612 may be associated with a first entity (e.g., "Hometown Auto Dealer"), and the document type B 614 may be associated with a second entity (e.g., "Another Auto Dealer"). In such a state, the data processing device system 110 may be configured according to methods associated with FIG. 5 to determine that an electronic document in the incoming document set is associated with, e.g., document type A 612 ("Hometown Auto Dealer" in this example) according to instructions associated with at least block 508 in FIG. 5, whereby the combined execution of methods associated with FIGS. 4 and 5 determine that electronic document to be an automobile lease form from Hometown Auto Dealer in this example.

This example further illustrates that the present invention is not limited to any particular definition of a genus document type (e.g., determined according to processes associated with FIG. 4) and a species document type (e.g., determined according to processes associated with FIG. 5). For instance, examples are provided herein that illustrate that the genus document type could be, e.g., an identification of a particular entity (e.g., "Hometown Auto Dealer" or each of other auto dealers) associated the incoming document set with the species document types being different types of documents (e.g., automobile lease or each of other document types) associated with the particular entity. On the other hand, the example provided immediately above illustrates that the genus document type could instead be, e.g., an identification of a particular type of document (e.g., automobile lease or each of other document types) with the species document types being identification of a particular entity (e.g., "Hometown Auto Dealer" or each of other auto dealers) associated the particular type of document.

For another example, while the implementation of the document-set type data structure illustrated, e.g., in FIG. 6, may be beneficial in some contexts, it may not be needed in other contexts. In this regard, in some embodiments, the document-set type data structure is not implemented, such that, e.g., FIG. 6 is modified to eliminate block 604 and its contents and to eliminate outer block 602 while retaining the first definition 610 and its contents. For example, in some embodiments where document-set types are not implemented, FIG. 6 may be modified to illustrate only first definition 610, which may render unnecessary, e.g., the processing associated with block 204 in FIG. 2, the processing associated with FIG. 4, and any other processing associated with a document-set type. In some embodiments, processing associated at least with one or more of blocks 514, 516, and 520 in FIG. 5 are omitted. These and other changes can be made to the invention in light of the above-detailed description and still fall within the scope of the present invention. In general, in the following claims, the terms used should not be construed to limit the invention to the specific embodiments disclosed in the specification. Accordingly, the invention is not limited by the disclosure, but instead its scope is to be determined entirely by the following claims.

What is claimed is:

1. A system comprising:
an input-output device system comprising a processor-accessible memory device system; and
a data processing device system communicatively connected to the input-output device system and the processor-accessible memory device system, the data processing device system configured by a program stored by the processor-accessible memory device system at least to:
access an electronic document via the input-output device system;
determine a document type associated with the electronic document based at least on a text-based, an image-based, or a text-based and an image-based analysis of the electronic document;
insert an electronic bookmark into the electronic document, based at least on the determined document type associated with the electronic document that was determined based at least on the text-based, image-based, or text-based and image-based analysis of the electronic document; and
store, in the processor-accessible memory device system, the electronic document including the electronic bookmark inserted therein,
wherein the text-based, image-based, or text-based and image-based analysis of the electronic document comprises:
accessing a first definition of a first set of document types associated with a first document-set type, the first definition stored by the processor-accessible memory device system, and the first definition identifying at least multi-word-phrase characteristics associated with each document type in the first set of document types associated with the first document-set type;
identifying, for the electronic document, a plurality of identified multi-word phrases determined to be in ordered text information in the electronic document, each multi-word phrase of the plurality of identified multi-word phrases comprising adjacent words in the ordered text information; and
analyzing the plurality of identified multi-word phrases with respect to the multi-word-phrase characteristics identified by the first definition and associated with each document type in the first set of document types associated with the first document-set type,
wherein the determining of the document type associated with the electronic document is based at least on a result of the analysis of the plurality of identified multi-word phrases with respect to the multi-word-phrase characteristics identified by the first definition and associated with each document type in the first set of document types associated with the first document-set type.

2. The system of claim 1, wherein the electronic bookmark inserted into the electronic document identifies at what page in the electronic document the document type begins.

3. The system of claim 1, wherein the electronic document is a portable document format ("PDF") document.

4. The system of claim 1, wherein the determining of the document type comprises determining a plurality of document types associated with the electronic document based at least on the text-based, image-based, or text-based and image-based analysis of the electronic document, and wherein the inserting into the electronic document the electronic bookmark comprises inserting a plurality of electronic bookmarks into the electronic document based at least on the determined plurality of document types associated with the electronic document that was determined based at least on the text-based, image-based, or text-based and image-based analysis of the electronic document.

5. The system of claim 4, wherein the plurality of electronic bookmarks inserted into the electronic document identify at what pages in the electronic document the plurality of document types respectively begin.

6. The system of claim 5, wherein the determined plurality of document types associated with the electronic document include at least some single page electronic documents, such that each of at least some electronic bookmarks of the plurality of electronic bookmarks inserted into the electronic document is associated with a single page.

7. The system of claim 5, wherein the electronic document is a portable document format ("PDF") document.

8. The system of claim 5, wherein the electronic document is a single electronic document file comprising a plurality of electronic documents each respectively associated with a document type of the determined plurality of document types.

9. The system of claim 1,
wherein the electronic document is a first electronic document,
wherein the multi-word-phrase characteristics associated with a particular document type in the first set of document types include a set of defined multi-word phrases for ordered text within an electronic document of the particular document type, and
wherein, for the first electronic document, the analysis of the plurality of identified multi-word phrases, with respect to the multi-word-phrase characteristics identified by the first definition and associated with each of at least the particular document type in the first set of document types associated with the first document-set type, comprises determining whether the plurality of identified multi-word phrases have a similarity with the set of defined multi-word phrases meeting a threshold.

10. The system of claim 9, wherein the data processing device system is configured by the program at least to:
select the threshold based at least on a number of multi-word phrases in the set of defined multi-word phrases for ordered text within an electronic document of the particular document type.

11. The system of claim 9, wherein the text-based, image-based, or text-based and image-based analysis comprises, for the first electronic document, and in a state in which it is determined that the threshold is not met for the first electronic document: determining, for the first electronic document, the document type from the first set of document types based at least on an image-comparison-analysis between a first image of the first electronic document and images of electronic documents from which the first definition is generated.

12. The system of claim 11, wherein the data processing device system is configured by the program at least to:
generate a first mega-pixel image from the first image of the first electronic document, the first mega-pixel image representing a first reduction in pixel resolution from the first image of the first electronic document; and
generate a second mega-pixel image from a second image of a second electronic document from which the first definition is generated, the second mega-pixel image representing a second reduction in pixel resolution from the second image of the second electronic document from which the first definition is generated, a first resolution of the first mega-pixel image equal to a second resolution of the second mega-pixel image,
wherein the image-comparison-analysis between the first image of the first electronic document and images of electronic documents from which the first definition is generated includes comparing pixel values of the first mega-pixel image and the second mega-pixel image.

13. A method executed by a data processing device system communicatively connected to an input-output device system comprising a processor-accessible memory device system, the method comprising:
accessing an electronic document via the input-output device system;
determining a document type associated with the electronic document based at least on a text-based, an image-based, or a text-based and an image-based analysis of the electronic document;
inserting an electronic bookmark into the electronic document, based at least on the determined document type associated with the electronic document that was determined based at least on the text-based, image-based, or text-based and image-based analysis of the electronic document; and
storing, in the processor-accessible memory device system, the electronic document including the electronic bookmark inserted therein,
wherein the text-based, image-based, or text-based and image-based analysis of the electronic document comprises:
accessing a first definition of a first set of document types associated with a first document-set type, the first definition stored by the processor-accessible memory device system, and the first definition identifying at least multi-word-phrase characteristics associated with each document type in the first set of document types associated with the first document-set type;
identifying, for the electronic document, a plurality of identified multi-word phrases determined to be in ordered text information in the electronic document, each multi-word phrase of the plurality of identified multi-word phrases comprising adjacent words in the ordered text information; and
analyzing the plurality of identified multi-word phrases with respect to the multi-word-phrase characteristics identified by the first definition and associated with each document type in the first set of document types associated with the first document-set type,
wherein the determining of the document type associated with the electronic document is based at least on a result of the analysis of the plurality of identified multi-word phrases with respect to the multi-word-phrase characteristics identified by the first definition and associated with each document type in the first set of document types associated with the first document-set type.

14. The method of claim 13, wherein the determining of the document type comprises determining a plurality of document types associated with the electronic document based at least on the text-based, image-based, or text-based and image-based analysis of the electronic document, and wherein the inserting into the electronic document the electronic bookmark comprises inserting a plurality of electronic bookmarks into the electronic document based at least on the determined plurality of document types associated with the electronic document that was determined based at least on the text-based, image-based, or text-based and image-based analysis of the electronic document.

15. The method of claim 14, wherein the plurality of electronic bookmarks inserted into the electronic document identify at what pages in the electronic document the plurality of document types respectively begin.

16. One or more non-transitory computer-readable storage mediums storing a program executable by one or more data processing devices of a data processing device system communicatively connected to an input-output device system, the program comprising:
first access instructions configured to cause accessing of an electronic document via the input-output device system;
determination instructions configured to cause determination of a document type associated with the electronic document based at least on a text-based, an image-based, or a text-based and an image-based analysis of the electronic document;

insertion instructions configured to cause insertion of an electronic bookmark into the electronic document, based at least on the determined document type associated with the electronic document that was determined based at least on the text-based, image-based, or text-based and image-based analysis of the electronic document; and storage instructions configured to cause storage, in a processor-accessible memory device system, of the electronic document including the electronic bookmark inserted therein, wherein, to facilitate execution of the text-based, image-based, or text-based and image-based analysis of the electronic document, the program comprises:

second access instructions configured to cause accessing of a first definition of a first set of document types associated with a first document-set type, the first definition stored by the processor-accessible memory device system, and the first definition identifying at least multi-word-phrase characteristics associated with each document type in the first set of document types associated with the first document-set type;

identification instructions configured to cause identification, for the electronic document, of a plurality of identified multi-word phrases determined to be in ordered text information in the electronic document, each multi-word phrase of the plurality of identified multi-word phrases comprising adjacent words in the ordered text information; and analysis instructions configured to cause analysis of the plurality of identified multi-word phrases with respect to the multi-word-phrase characteristics identified by the first definition and associated with each document type in the first set of document types associated with the first document-set type, wherein the determination of the document type associated with the electronic document is based at least on a result of the analysis of the plurality of identified multi-word phrases with respect to the multi-word-phrase characteristics identified by the first definition and associated with each document type in the first set of document types associated with the first document-set type.

17. The one or more non-transitory computer-readable storage mediums of claim 16, wherein the determination instructions are configured to cause determination of the document type at least by causing a determination of a plurality of document types associated with the electronic document based at least on the text-based, image-based, or text-based and image-based analysis of the electronic document, and wherein the insertion instructions are configured to cause the insertion of the electronic bookmark into the electronic document the electronic bookmark at least by causing insertion of a plurality of electronic bookmarks into the electronic document based at least on the determined plurality of document types associated with the electronic document that was determined based at least on the text-based, image-based, or text-based and image-based analysis of the electronic document.

18. The one or more non-transitory computer-readable storage mediums of claim 17, wherein the plurality of electronic bookmarks inserted into the electronic document identify at what pages in the electronic document the plurality of document types respectively begin.

* * * * *

UNITED STATES PATENT AND TRADEMARK OFFICE
CERTIFICATE OF CORRECTION

PATENT NO.         : 10,846,482 B2
APPLICATION NO.    : 16/575948
DATED              : November 24, 2020
INVENTOR(S)        : John Frank Walsh Page 1 of 1

It is certified that error appears in the above-identified patent and that said Letters Patent is hereby corrected as shown below:

On the Title Page

Column 2, Under the References Cited, Other Publications Section, after Line 13 Insert:
--BRODER. "Identifying and Filtering Near-Duplicate Documents." Combinatorial Pattern Matching. CPM 2000: 1-10. Lecture Notes in Computer Science. Vol. 1848. Springer, Berlin, Heidelberg.--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*